(12) United States Patent
Wan et al.

(10) Patent No.: US 8,963,947 B2
(45) Date of Patent: Feb. 24, 2015

(54) ENHANCED LOOKUP OF DISPLAY DRIVING VALUES

(75) Inventors: Chun Chi Wan, Richmond (CA); Terence Lau, Burnaby (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 254 days.

(21) Appl. No.: 13/307,515

(22) Filed: Nov. 30, 2011

(65) Prior Publication Data

US 2012/0188229 A1 Jul. 26, 2012

Related U.S. Application Data

(60) Provisional application No. 61/436,142, filed on Jan. 25, 2011.

(51) Int. Cl.
*G09G 5/06* (2006.01)
*H04N 9/69* (2006.01)
*H04N 1/407* (2006.01)

(52) U.S. Cl.
CPC .............. *G09G 5/06* (2013.01); *H04N 1/407* (2013.01); *H04N 9/69* (2013.01); *G09G 2340/10* (2013.01)
USPC ........................... 345/602; 345/419; 345/589

(58) Field of Classification Search
USPC ................................. 345/602, 419
See application file for complete search history.

(56) References Cited

U.S. PATENT DOCUMENTS

| | | | |
|---|---|---|---|
| 5,053,866 A | 10/1991 | Johnson | |
| 5,377,041 A | 12/1994 | Spaulding | |
| 5,539,540 A * | 7/1996 | Spaulding et al. | 358/518 |
| 5,565,931 A | 10/1996 | Girod | |
| 5,594,557 A | 1/1997 | Rolleston | |
| 5,809,213 A | 9/1998 | Bhattacharjya | |
| 6,115,031 A * | 9/2000 | Love et al. | 345/603 |
| 6,232,954 B1 | 5/2001 | Rozzi | |
| 6,992,683 B2 | 1/2006 | Shin | |
| 7,106,344 B2 | 9/2006 | D'Souza | |
| 7,236,627 B2 | 6/2007 | Takahashi | |
| 7,439,984 B2 | 10/2008 | Yamada | |
| 2002/0122207 A1* | 9/2002 | Klassen et al. | 358/2.1 |
| 2003/0133138 A1 | 7/2003 | Namikata | |
| 2005/0069201 A1* | 3/2005 | Speigle et al. | 382/167 |
| 2007/0211298 A1 | 9/2007 | Ishii | |
| 2008/0180290 A1 | 7/2008 | Baer | |
| 2009/0002785 A1 | 1/2009 | Marcu | |
| 2010/0013851 A1 | 1/2010 | Shoup | |

FOREIGN PATENT DOCUMENTS

| | | |
|---|---|---|
| JP | 2002116750 | 4/2002 |
| JP | 2007081851 | 3/2007 |
| JP | 2009206699 | 9/2009 |

(Continued)

*Primary Examiner* — Mark Zimmerman
*Assistant Examiner* — Sohum Kaji

(57) ABSTRACT

Approximation errors commonly occur when color transformation values stored in color look-up tables are interpolated to produce color display drive signals, since the stored transformation values typically correspond to non-linear functions. Such errors can be reduced by applying a pre-indexing function to the transformation values before they are stored in the look-up table, and by applying the same function to values extracted from the table during look-up operations. Alternatively, such errors can be reduced by providing one or more additional look-up tables to achieve higher order (i.e. more accurate) interpolation results that are achievable by interpolation of values stored in a single look-up table.

18 Claims, 29 Drawing Sheets

(56) References Cited

FOREIGN PATENT DOCUMENTS

| | | |
|---|---|---|
| KR | 20050120963 | 12/2005 |
| KR | 20080016016 | 2/2008 |
| WO | 2008156445 | 12/2008 |

* cited by examiner

| Iteration | Secondary LUT Coefficients | Error Difference (→ 0) |
|---|---|---|
| 1 | [0  0.4082  0.5774  0.7071  0.8165  0.9129  1.0000] | 6.331682895283882E-05 |
| 2 | [0  0.4083  0.5774  0.7071  0.8165  0.9129  1.0000] | 6.337356270571 03E-05 |
| 3 | [0  0.4082  0.5775  0.7071  0.8165  0.9129  1.0000] | 6.342445189 8428E-05 |
| ... | ... | ... |
| 90 | [0  0.3631  0.5395  0.6796  0.8012  0.9073  1.0000] | 1.102168492027 15E-05 |
FIGURE 13
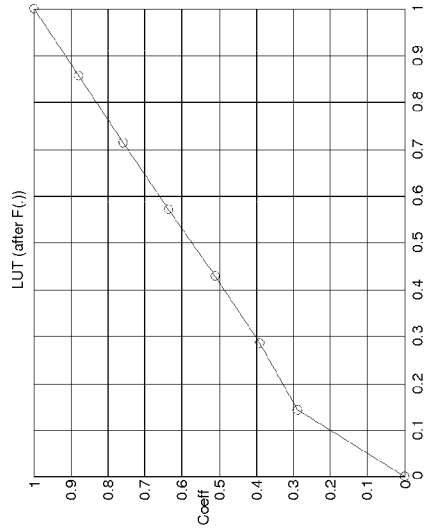
FIGURE 14
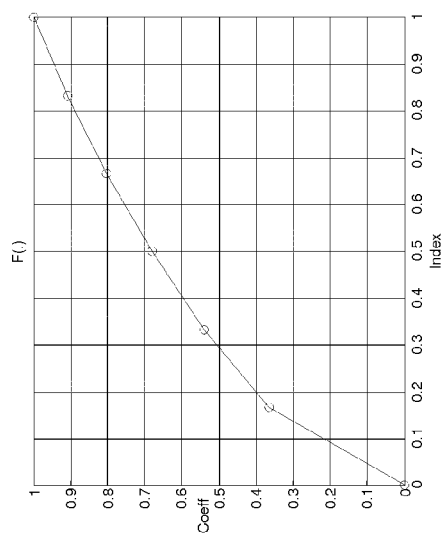
FIGURE 15

ENHANCED LOOKUP OF DISPLAY DRIVING VALUES

CROSS REFERENCE TO RELATED APPLICATIONS

This Application claims the benefit of priority to related Provisional U.S. Patent Application No. 61/436,142 filed on 25 Jan. 2011 entitled "Enhanced Lookup of Display Driving Values" by Chun Chi Wan, et al. hereby incorporated by reference in its entirety.

TECHNICAL FIELD

This disclosure relates to the use of lookup tables to obtain output values corresponding to given input values according to non-linear transformations. The methods and apparatus described herein have application, for example, to look-up tables used in driving color displays. Some examples of color displays are televisions, computer displays, cinema displays, and special purpose displays such as advertising displays and virtual reality displays. Specific embodiments perform interpolation operations upon non-linear input-to-output color transformation values.

BACKGROUND

Color look-up tables (LUTs) are used to transform input color signal representations into output color signal representations which can be applied to drive a color display. Such transformations are necessary because color displays commonly have non-linear input to output signal transformation characteristics. Ideally, for a given input value, a LUT generates a corresponding output value that precisely cancels the effects of a display's non-linearity so that colors appearing on the display accurately correspond to the colors defined by the input color signal representations. The LUT may be embedded in a hardware imaging system, or may be implemented via image processing software.

A typical LUT contains representations of different input color signals which are preselected to span the range of input drive signals that may be encountered during normal operation of the display. For each input color signal representation, the LUT also stores either a corresponding output color signal representation or information which can be used to derive a corresponding output color signal representation. As explained below, an input color signal representation is processed by extracting its closest corresponding output color signal representation from the LUT, or by using the information stored in the LUT to derive an output color signal representation which most closely corresponds to the input color signal representation. The extracted or derived output color signal representation is applied to drive the display.

Input color signal representations stored in a LUT can be predefined by sampling test signals representative of the input drive signals that may be encountered during normal operation of the display. Uniform and non-uniform signal sampling techniques are common. Non-uniform sampling can provide improved accuracy in comparison to uniform sampling, but increases cost, complexity, or both. The accuracy improvement is illustrated in FIGS. 1A and 1B, in which the solid lines represent a desired non-linear system response (which is identical in both Figures), the circles represent signal sampling points and the dashed lines represent linear interpolation between the sampling points. FIG. 1A illustrates uniform sampling, i.e. the sampling points are equally horizontally spaced; whereas FIG. 1B illustrates non-uniform sampling, i.e. the sampling points are not equally horizontally spaced.

Interpolation error is proportional to the total area between the solid and dashed lines. The total area between the solid and dashed lines in FIG. 1A is larger than the total area between the solid and dashed lines in FIG. 1B, signifying that, on average, the uniform sampling of FIG. 1A yields a larger interpolation error than the non-uniform sampling of FIG. 1B. It is desirable to minimize such interpolation errors. In general, linear interpolation of a non-linear function using a finite number of appropriately-selected non-uniform sampling points can approximate the sampled function more accurately (i.e. yields a smaller average interpolation error) than linear interpolation of the same function using the same finite number of uniform sampling points.

If a non-uniform sampling technique is used to predefine the input color signal representations stored in an LUT, the non-uniform sample spacing interval may correspond to the inverse of the display system's response characteristic. This is illustrated in FIGS. 2A and 2B, in which the solid lines represent a desired non-linear system response (which is identical in both Figures, and is in this case $y=x^2$ where x and y are the input and output signal values respectively), the circles represent signal sampling points and the dashed lines represent linear interpolation of the sampling points. FIG. 2A illustrates a uniform sampling technique in which the input signal x is uniformly sampled at equally spaced 0.25 unit intervals along the x axis to yield a series of uniformly spaced index values A, [0, 0.25, 0.5, 0.75, 1]. The five y output values circled on the $y=x^2$ system response curve represent the interpolant or coefficient of interpolation for each one of the five corresponding x input values.

FIG. 2B illustrates a non-uniform sampling technique in which the input signal x is non-uniformly sampled in accordance with the inverse system response, i.e. $x=y^{1/2}$, to yield a series of non-uniformly spaced index values B, [0, 0.5, 0.707, 0.866, 1] which, in this example, are the square roots of the uniformly spaced A index values described above in relation to FIG. 2A. The total area between the solid and dashed lines in FIG. 2A is larger than the total area between the solid and dashed lines in FIG. 2B, again signifying that linear interpolation of a non-linear function using a finite number of non-uniform sampling points can approximate the sampled function more accurately (i.e. can yield a smaller average interpolation error) than linear interpolation of the same function using the same finite number of uniform sampling points.

Uniform sampling facilitates relatively simple and inexpensive linear interpolation operations, i.e. linear interpolation can be performed without performing division operations which are often required to perform linear interpolation of non-uniformly sampled values. However the improved accuracy obtainable by non-uniform sampling may be sufficiently desirable to warrant the added cost and complexity of using a non-uniform sampling technique to predefine the input color signal representations stored in an LUT.

FIG. 3 depicts an LUT 10 for transforming red, green and blue input color signals $R_{in}$, $G_{in}$, $B_{in}$ into red, green and blue output color signals $R_{out}$, $G_{out}$, $B_{out}$ respectively. LUT 10 may have a one-dimensional (1D), two-dimensional (2D) or three-dimensional (3D) characteristic. A 1D LUT, such as LUT 10A shown in FIG. 4A transforms one input signal X (e.g. one of the aforementioned $R_{in}$, $G_{in}$ or $B_{in}$ input signals) into a corresponding output signal G(X) (e.g. one of the aforementioned $R_{out}$, $G_{out}$ or $B_{out}$ output signals). A 3D LUT, such as LUT 10B shown in FIG. 4B transforms three input signals X1,X2,X3 (e.g. the aforementioned $R_{in}$, $G_{in}$ and $B_{in}$ input signals) into a single corresponding output signal G(X1,X2, X3) (e.g. one of the aforementioned $R_{out}$, $G_{out}$ or $B_{out}$ output signals).

A typical LUT has a storage component, an interpolation component and a control component. For example, 1D LUT 10A shown in FIG. 4A has a 1D storage component 12A, a 1D interpolation component 14A and a control component 16A. 3D LUT 10B shown in FIG. 4B has a 3D storage component 12B, a 3D interpolation component 14B and a control component 16B. The storage component contains input data samples, which may be predefined as aforesaid using uniform or non-uniform sampling techniques. The interpolation component facilitates interpolation (approximation) as aforesaid between stored data samples if the input signal X or X1,X2, X3 does not match a stored input data sample, to derive an interpolated output value G(X) or G(X1,X2,X3) corresponding to the input signal.

The control component generates indices and coefficients corresponding to the input signal for use by the interpolation component in performing interpolation operations. The indices (i.e. the x axis values described above in relation to FIGS. 2A and 2B) are used to address input data samples stored in the storage component. The coefficients (i.e. the y axis values described above in relation to FIGS. 2A and 2B) define output signal representations corresponding to the respective input data samples.

FIG. 5 depicts a prior art color transformation system incorporating three 1D LUTs, namely R-channel LUT 20, G-channel LUT 22 and B-channel LUT 24. The red channel input signal $R_{in}$ is applied to LUT 20, the green channel input signal $G_{in}$ is applied to LUT 22, and the blue channel input signal $B_{in}$ is applied to LUT 24. R-channel LUT 20 interpolates as aforesaid to produce a red channel output signal $R_{LUTout}$ utilizing indices and coefficients which are extracted or derived based on the red channel input signal $R_{in}$. G-channel LUT 22 and B-channel LUT 24 similarly interpolate to produce green and blue channel output signals $G_{LUTout}$ and $B_{LUTout}$ respectively, utilizing indices and coefficients which are extracted or derived based on the green and blue channel input signals $G_{in}$ and $B_{in}$ respectively. The three output signals $R_{LUTout}$, $G_{LUTout}$, $B_{LUTout}$ are used to drive a display device.

FIG. 6 depicts a prior art color transformation system incorporating three 3D LUTs, namely R channel LUT 26, G channel LUT 28 and B channel LUT 30. All three of the red, green and blue channel input signals $R_{in}$, $G_{in}$, $B_{in}$ are applied to each one of 3D LUTs 26, 28 and 30. R channel LUT 26 interpolates as aforesaid to produce a red channel output signal $R_{LUTout}$ utilizing indices and coefficients which are extracted or derived based on all three of the red, green and blue channel input signals $R_{in}$, $G_{in}$ and $B_{in}$. G channel LUT 28 and B channel LUT 30 similarly interpolate to produce green and blue channel output signals $G_{LUTout}$ and $B_{LUTout}$ respectively, in both cases utilizing indices and coefficients which are extracted or derived based on all three of the red, green and blue channel input signals $R_{in}$, $G_{in}$ and $B_{in}$. The three output signals $R_{LUTout}$, $G_{LUTout}$, $B_{LUTout}$ are used to drive a display device.

If an LUT's stored input data samples are uniformly spaced then linear interpolation is typically performed by looking up, in the storage component, the two data samples which are most nearly equal to the input signal value, i.e. the two stored data samples corresponding to lower and upper nodes of an interval that bounds the input value. If the input value exactly matches one of the two node values, or if the function which defines the distribution of stored data samples is precisely linear between the two node values, then the interpolation operation will produce an output value which exactly matches the input value. However, if the input value does not exactly match one of the two node values and the function which defines the distribution of stored data samples is non-linear between the two node values, then the interpolation operation will not produce an output value which exactly matches the input value but will generally produce an output value characterized by an approximation error.

This is illustrated by FIGS. 7A-7D which depict a prior art 1D LUT generation technique for a display system having independent R, G and B channels. The system's R, G and B channel responses are respectively represented as $S_R()$, $S_G()$ and $S_B()$ with $V_R()$ $V_G()$ and $V_B()$ respectively representing the system's inverse R, G and B channel responses. For example, in FIG. 7A the dashed line labeled $S_R()$ represents the display system's red channel response. $R_{in}'$ represents a test red channel input signal applied to the system and $R_{out}'$ represents the display system's red channel response to the applied $R_{in}'$ test signal. In FIG. 7B, the dashed line labeled $V_R()$ represents the inverse of the $S_R()$ response.

The R channel's inverse response $V_R()$ is used to construct the 1D R_LUT shown in FIG. 7D. To accomplish this, the display system's R channel response is first characterized by sampling the $R_{out}'$ signal at five uniformly spaced intervals, each corresponding to a different $R_{in}'$ test signal value, as indicated by the five circles shown in FIG. 7A. The five sampled $R_{out}'$ signal values define the coefficients, and the corresponding $R_{in}'$ test signal values define the indices for the 1D R_LUT. As seen in FIG. 7B, the coefficients (again represented by five circles) are non-uniformly spaced with respect to the $R_{out}'$ axis. Linear interpolation based on five uniformly spaced samples of the FIG. 7B $R_{out}'$ signal (as indicated by the five squares in FIG. 7B) yields a $V_R'()$ characteristic represented by the thick solid line shown in FIG. 7B, which deviates significantly from the desired inverse response $V_R()$ of the R channel. Consequently, significant undesirable approximation errors will result if an R_LUT generated as above is applied to the display system.

The LUT can be improved in various ways. One improvement technique is to increase the number of uniformly separated sampling points used to construct the LUT, but this increases complexity and storage requirements. A second technique is to construct the LUT using non-uniformly separated sampling points as explained above, e.g. using non-uniform $R_{in}'$ sample spacings corresponding to the inverse channel response, but this requires prior knowledge of the channel response characteristic. A third technique is to use non-uniformly separated sampling points for the LUT index, or to apply the inverse channel response to the LUT index, but this requires computation of the inverse channel response, which can be very complex in some cases.

FIG. 8A schematically illustrates generation of a 3D LUT, labeled R_LUT, which in this example is used to transform R channel signals. FIG. 8B illustrates application of the generated R_LUT to transform red channel signals, together with application of two other 3D LUTs labeled G_LUT and B_LUT which are used to transform G and B channel signals respectively. As shown in FIG. 8B, each one of the $R_{out}$, $G_{out}$, and $B_{out}$ output channels is derived utilizing all three of the $R_{in}$, $G_{in}$ and $B_{in}$ input channels, as indicated for the $R_{in}$ channel by heavy solid lines in FIGS. 8A and 8B. The FIG. 8A 3D LUT is generated using coefficients formed by the $R_{out}'$, $G_{out}'$ and $B_{out}'$ signals as inputs and using the corresponding $R_{in}'$ values as outputs. System measurements of the $R_{out}'$, $G_{out}'$, and $B_{out}'$ values form the inputs of the LUT response, and the corresponding $R_{in}'$ value forms the output of the LUT response. Usually, trilinear interpolation is used to interpolate the 3D LUT. The 3D LUTs provide $V_{R\_3D}$, $V_{G\_3D}$, and $V_B$ $_{3D}$ response characteristics for the R, G and B channels respectively. Non-linear sample space in $R_{out}'$, $G_{out}'$, and $B_{out}'$ based on the inverse system response also improves the LUT accuracy. However, it is more challenging to compute the inverse system response for a 3D system.

FIG. 9 is a flow chart in which the left column depicts an LUT generation procedure and the right column depicts a corresponding lookup procedure for use in applying the generated LUT to a particular display system. With reference to the left column, a series of $R_{in}'$, $G_{in}'$, $B_{in}'$ test input signals selected to represent the full range of the system's R, G, and B display capability are applied to the system (FIG. 9, block 910). The display's optical output response to each input test signal is measured using a device such as a spectral analyzer (FIG. 9, block 920). Such devices typically output either XYZ tristimulus values or spectral values. If spectral values are output then they are converted to XYZ tristimulus values using a suitable color matching function. The XYZ tristimulus values corresponding to the maximum R, G and B channels are used to derive an XYZ-to-RGB conversion matrix which is applied (FIG. 9, block 930) to convert the measured XYZ tristimulus values into $R_{out}'$, $G_{out}'$, and $B_{out}'$ outputs corresponding to the previously applied $R_{in}'$, $G_{in}'$, $B_{in}'$ test input signal. The LUT is then generated (FIG. 9, block 940) as described above in relation to FIGS. 7A-7D in the case of a 1D LUT, or FIGS. 8A-8B in the case of a 3D LUT. If non-uniform sampling is used to improve the LUT's accuracy, then the inverse system response is computed to form the LUT index values as previously described.

The right column of FIG. 9 depicts performance of an LUT lookup operation for a received (FIG. 9, block 950) input signal having $R_{in}$, $G_{in}$, and $B_{in}$ components. The LUT indices corresponding to each of the received $R_{in}$, $G_{in}$, and $B_{in}$ signal components are determined, and the corresponding coefficients are either extracted from the LUT's storage or generated as previously explained (FIG. 9, block 960). The indices and coefficients are then applied (FIG. 9, block 970) to interpolate $R_{LUTout}$, $G_{LUTout}$, $B_{LUTout}$ values based on the two interpolants closest to the respective $R_{in}$, $G_{in}$, and $B_{in}$ signal components. Usually, linear interpolation is used in the 1D case and trilinear interpolation is used in the 3D case. The dotted line in FIG. 9 shows how the LUT indices and coefficients are generated. The $R_{LUTout}$, $G_{LUTout}$, $B_{LUTout}$ are then applied to the display (FIG. 9, block 980). Ideally, the display system's non-linear response characteristic is cancelled out by the LUT.

The non-linear nature of the transformation effected by a LUT, coupled with the increased need for interpolation in performing 3D LUT look-ups and the increased error magnitude of such interpolation, gives rise to a need for error reduction in the performance of LUT interpolation operations. This disclosure addresses that need.

BRIEF DESCRIPTION OF THE DRAWINGS

Exemplary embodiments are illustrated in the appended drawings. The embodiments and figures disclosed herein are illustrative and are not intended to be restrictive.

FIG. 13 tabulates iterative generation of coefficients for the FIG. 12 secondary LUT.

FIG. 14 graphically depicts iteratively generated coefficients for the FIG. 12 secondary LUT.

FIG. 15 graphically depicts iteratively generated coefficients for the FIG. 12 primary LUT.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Non-Linearity Error Reduction—Example Method and Apparatus 1

Generation of LUT indices that can be used to perform non-uniform interpolation operations requires prior knowledge of a display system's inverse response characteristic. This is feasible for a display system having a simple gamma type response characteristic, since it is relatively simple to determine the inverse response characteristic of such a system. However, it can be very difficult to accurately determine the inverse response characteristic of a more complex display system, such as a dual modulation display system or a display system having a highly non-linear response characteristic. The following technique method facilitates improvement of LUT accuracy (i.e. reduction of approximation errors) and can be performed without requiring explicit knowledge or determination of a display system's inverse response characteristic.

Figure 10:
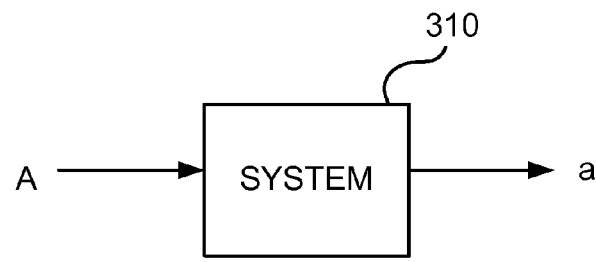
FIG. 10 is a simplified block diagram depiction of a prior art display system.
Figure 11A:
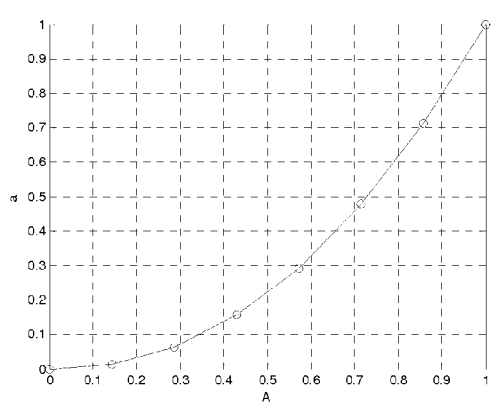
FIG. 11A graphically depicts the input-to-output response characteristic of the FIG. 10 display system.

FIG. 10 depicts a display system 310 which produces an output signal a in response to an applied input signal A. Assume that the input and output signal values are normalized, such that the value of the input signal A is within the range 0 A 1 and the value of the output signal a is within the range 0 a 1. Also assume that display system 310 has a response characteristic which can be represented by the equation $a=A^{2.2}$. FIG. 11A graphically depicts the $a=A^{2.2}$ response characteristic of display system 310. The eight circles shown in FIG. 11A represent eight uniformly spaced sampling points, respectively corresponding to the following input and output values:

TABLE 1

| A | $a = A^{2.2}$ |
|---|---|
| 0/7 = 0 | 0 |
| 1/7 = 0.1429 | 0.01383 |
| 2/7 = 0.2857 | 0.0635 |
| 3/7 = 0.4286 | 0.1550 |
| 4/7 = 0.5714 | 0.2919 |
| 5/7 = 0.7143 | 0.4770 |
| 6/7 = 0.8571 | 0.7123 |
| 7/7 = 1.0000 | 1.0000 |

Figure 12:
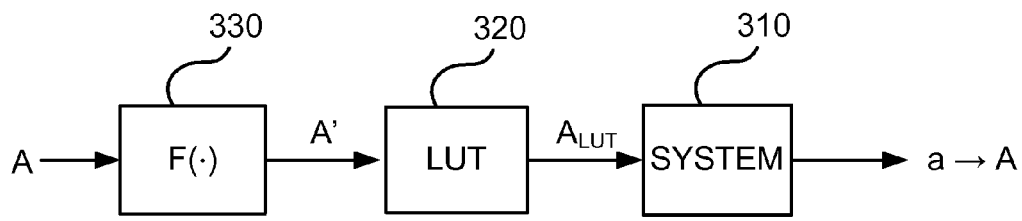
FIG. 12 is a simplified block diagram depicting utilization of primary and secondary LUTs to compensate for a display system's response characteristic.

The objective is to compensate for display system 310's response characteristic such that any value a output by the system will closely approximate (and will ideally be equal to) the corresponding input value A which is applied to display system 310. FIG. 12 depicts one arrangement for attaining this objective utilizing a primary LUT 320 connected in series with a secondary LUT 330. The index and coefficient values of primary LUT 320 and secondary LUT 330 are generated as described below to attain the foregoing objective.

The index values of secondary LUT 330 are generated to correspond to uniformly spaced signal sample values, with the sample spacing defined by the number of sample values which are to be stored in secondary LUT 330. For example, secondary LUT 330 may store 7 samples, with each sample corresponding to one A input signal value. The number of samples stored in secondary LUT 330 is independent of the size (i.e. total storage capacity) of secondary LUT 330 and is also independent of the number of signal sample measurements which may have been made in order to characterize display system 310's response characteristic. Thus, the index values of secondary LUT 330 are fixed and uniformly spaced and may for example be:

TABLE 2

| Secondary LUT Index No. | Secondary LUT index value |
|---|---|
| 0 | 0/6 = 0 |
| 1 | 1/6 = 0.1666 |
| 2 | 2/6 = 0.3333 |
| 3 | 3/6 = 0.5000 |
| 4 | 4/6 = 0.6666 |
| 5 | 5/6 = 0.8333 |
| 6 | 6/6 = 1.0000 |

Figure 11B:
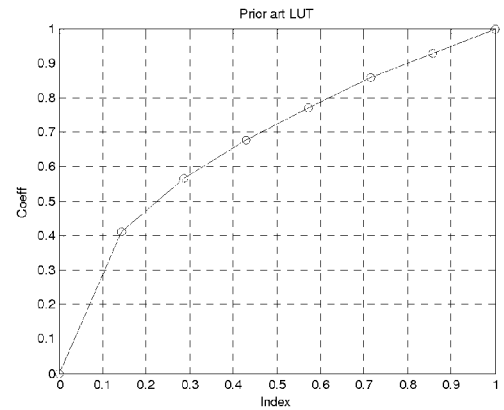
FIG. 11B graphically depicts the inverse response characteristic of the FIG. 10 display system.

The coefficient values of secondary LUT 330 are generated using an iterative optimization procedure. The initialization values chosen for the coefficient values of secondary LUT 330 are selected to facilitate performance of the optimization procedure, e.g. to avoid local minima. For example, one may choose to initialize the coefficient values of secondary LUT 330 by assigning an initial value $x^{0.5}$ to each coefficient, where x represents the corresponding secondary LUT 330 index value. Note that $x^{0.5}$ is a reasonably close approximation of the inverse of display system 310's response characteristic as shown in FIG. 11B. It is not necessary to compute or to have prior knowledge of the inverse system response, but if the display system has a simple gamma-like response characteristic, then secondary LUT 330 can be initialized to approximate the inverse system response. Thus, the initial coefficient index values chosen for secondary LUT 330 may for example be:

TABLE 3

Secondary LUT Interpolation Input

| Secondary LUT Coeff No. | index value | coeff. value |
|---|---|---|
| 0 | 0/6 = 0 | $0^{.5} = 0$ |
| 1 | 1/6 = 0.1666 | $0.1666^{.5} = 0.4082$ |
| 2 | 2/6 = 0.3333 | $0.3333^{.5} = 0.5773$ |
| 3 | 3/6 = 0.5000 | $0.5000^{.5} = 0.7071$ |
| 4 | 4/6 = 0.6666 | $0.6666^{.5} = 0.8165$ |
| 5 | 5/6 = 0.8333 | $0.8333^{.5} = 0.9129$ |
| 6 | 6/6 = 1.0000 | $1.0000^{.5} = 1.0000$ |

The index and coefficient values shown in Table 3 are stored in secondary LUT 330 and define the input interpolation operations performed by secondary LUT 330. The corresponding output interpolation operations are also characterized by index and coefficient values, with each index and coefficient value pair corresponding to a test measurement output value of a which is produced by display system 310 in response to a corresponding applied input signal value A.

The index values used by primary LUT 320 to perform input interpolation operations are generated in response to the corresponding interpolation A' signal values (i.e. the coefficient values stored in secondary LUT 330) which are output by secondary LUT 330 and applied as the input to primary LUT 320. The coefficient values used by primary LUT 320 to perform input interpolation operations correspond to the A signal values which are to be applied as inputs to display system 310.

The output interpolation operations performed by primary LUT 320 are also characterized by index and coefficient values. The index values of primary LUT 320 are generated to correspond to uniformly spaced signal sample values, with the sample spacing defined by the number of sample values which are to be stored in primary LUT 320. For example, primary LUT 320 may store 8 samples. The number of samples stored in primary LUT 320 is independent of the size (i.e. total storage capacity) of primary LUT 320 and is also independent of both the size and the number of samples stored in secondary LUT 330. Thus, the index values of primary LUT 320 are fixed and uniformly spaced and may for example be:

TABLE 4

| Primary LUT Index No. | Primary LUT index value |
|---|---|
| 0 | 0/7 = 0 |
| 1 | 1/7 = 0.1429 |
| 2 | 2/7 = 0.2857 |
| 3 | 3/7 = 0.4286 |
| 4 | 4/7 = 0.5714 |
| 5 | 5/7 = 0.7143 |
| 6 | 6/7 = 0.8571 |
| 7 | 7/7 = 1.0000 |

The coefficient values of primary LUT 320 may be generated, for example, in the same manner as the coefficient values for a prior art LUT as described above. Better results (e.g. reduced interpolation error in the output signal values from primary LUT 320) may be obtained by optimizing the index and coefficient values of both primary and secondary LUTs 320, 330 together.

For example, if secondary LUT produces an output F(x) corresponding to an input value x, then primary LUT 330 will receive the value F(x) as its input to produce an overall output value G(F(x)). The optimization attempts to minimize a measure of the average difference between G(F(x)) and the function S(x) (which may be, for example the inverse response characteristic of a display system) that the output of primary LUT 330 is intended to closely approximate. As a starting point for optimization, secondary LUT 320 may be populated with indices and coefficients such that F(x) is more rapidly varying where the slope of S(x) is rapidly varying (i.e. where the second derivative of S(x) is larger) and less rapidly varying where the slope of S(x) is less rapidly varying. The indices and coefficients of primary LUT 330 may then be selected such that G(.) takes values of F(x) produced by secondary LUT 320 to S(x).

After the index and coefficient values of both primary and secondary LUTs 320, 330 are initially determined, for example, as described above, a test is performed by applying a series of test input signals to the FIG. 12 system. The test input signal values are selected to differ from the A signal values shown in Table 1, and may for example be:

TABLE 5

Test Signals

| Test Signal No. | Test Signal Value |
|---|---|
| 1 | 0.0714 |
| 2 | 0.2143 |
| 3 | 0.3571 |
| 4 | 0.5000 |
| 5 | 0.6429 |
| 6 | 0.7857 |
| 7 | 0.9286 |

The index and coefficient interpolation values stored in secondary LUT 330 define the A' output signal values produced by secondary LUT 330 in response to each test signal value which is applied as an input to secondary LUT 330. The A' output signal values produced by secondary LUT 330 are applied as inputs to primary LUT 320, and the index and coefficient interpolation values stored in primary LUT 320 define the $A_{LUT}$ output signal values which are produced by primary LUT 320 and applied as inputs to display system 310 to produce the output signal a which is then measured and compared with the test input signal A to determine how closely the output signal a approximates the test input signal A.

Specifically, after application of each test input signal, a mathematical operation is performed to compute the error difference between the output signal produced by display system 310 and the corresponding test input signal. Various well known mathematical error computation procedures can be used, for example including computation of:

the absolute value of the difference between each test input signal and the corresponding output signal produced by display system 310;

the average of the absolute value of the difference between each test input signal and the corresponding output signal produced by display system 310;

the average value of the output signal produced by display system 310;

the total sum of the squares of the difference between each test input signal and the average value of the output signal produced by display system 310;

the residual sum of the squares of the difference between each test input signal and the corresponding output signal produced by display system 310; or the ratio of the aforementioned residual and total sums of squares.

After computation of the error difference for each test input signal, a suitable mathematical operation is performed to determine revised coefficient values for secondary LUT 330 which will minimize the computed error difference by reducing it to zero or to a value which does not exceed a predefined error threshold value. Various well known mathematical error minimization procedures can be used, for example including application of the Matlab™ lsqnonlin function. The aforementioned test signal input, output signal measurement, error difference computation and minimization operations are iteratively repeated until the computed error difference is reduced to zero or to a value which does not exceed a predefined error threshold value. FIG. 13 depicts the results obtained for the $1^{st}$, $2^{nd}$, $3^{rd}$ and $90^{th}$ iterations in a sequence of 90 such iterations. FIG. 14 graphically depicts the final, uniformly spaced coefficients obtained for secondary LUT 330 after the $90^{th}$ iteration depicted in FIG. 13. FIG. 15 graphically depicts the corresponding coefficients obtained for primary LUT 320 after the $90^{th}$ iteration depicted in FIG. 13.

Figure 16:
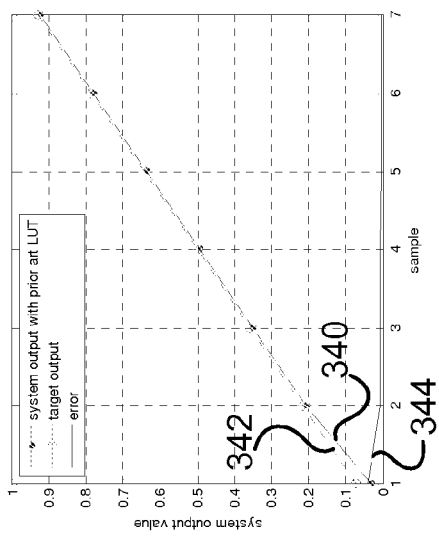
FIG. 16 graphically depicts target and actual output values produced by a prior art LUT, and shows the error difference between the depicted target and actual output values.

Line 340 shown in FIG. 16 plots target (i.e. ideal) output values produced by a display system incorporating a prior art LUT (i.e. without a secondary LUT as shown in FIG. 12) in response to 7 uniformly spaced input signal samples. Line 342 shown in FIG. 16 plots the actual output values produced by the same display system incorporating the same prior art LUT in response to the same 7 input signal samples. Line 344 shown in FIG. 16 plots the error difference between the depicted line 340 and line 342 target and actual output values.

Figure 17:
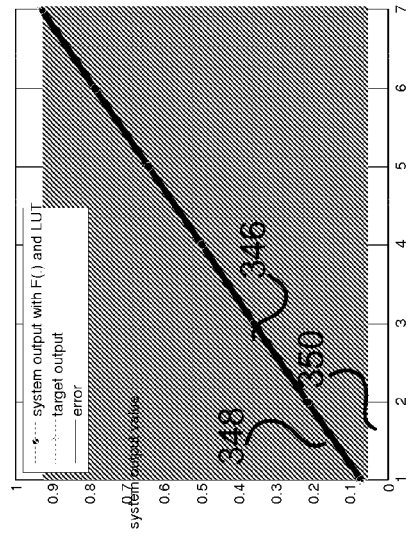
FIG. 17 graphically depicts target and actual output values produced by the FIG. 12 apparatus, and shows the error difference between the depicted target and actual output values.

Line 346 shown in FIG. 17 plots target (i.e. ideal) output values produced by the FIG. 12 apparatus utilizing the iteratively generated secondary and primary LUT coefficients depicted in FIGS. 14 and 15 respectively, in response to the same seven input signal samples used to obtain the results shown in FIG. 16. Line 348 shown in FIG. 17 plots the actual output values produced by the FIG. 12 apparatus in response to the same seven input signal samples. It is difficult to discriminate between lines 346 and 348 in FIG. 17, due to the close correspondence between the target and actual output values. Line 350 shown in FIG. 17 plots the error difference between the depicted line 346 and line 348 target and actual output values. Line 350 is very close to the horizontal axis of FIG. 17, again reflecting the close correspondence between the target and actual output values.

Figure 18:
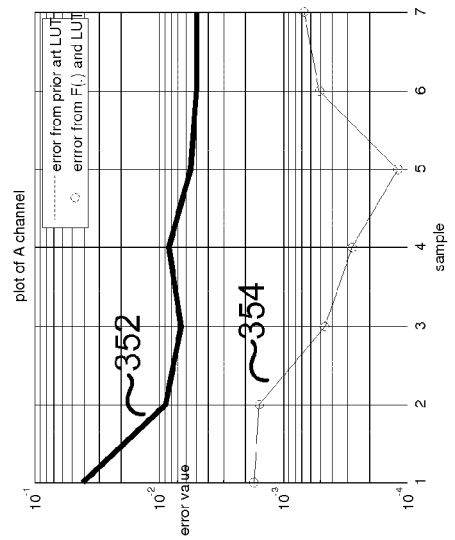
FIG. 18 graphically compares the error differences depicted in FIGS. 16 and 17.

FIG. 18 graphically compares the error differences depicted in FIGS. 16 and 17, on a n enlarged logarithmic scale. Line 352 shown in FIG. 18 corresponds to line 344 shown in FIG. 16, and line 354 shown in FIG. 18 corresponds to line 350 shown in FIG. 16. As can be seen, the error difference achieved by the FIG. 12 apparatus is significantly smaller than the error difference achieved by the prior art apparatus, demonstrating the capability of the FIG. 12 apparatus to produce actual output values which more closely match the target output values, in comparison to the prior art apparatus.

Figure 19:
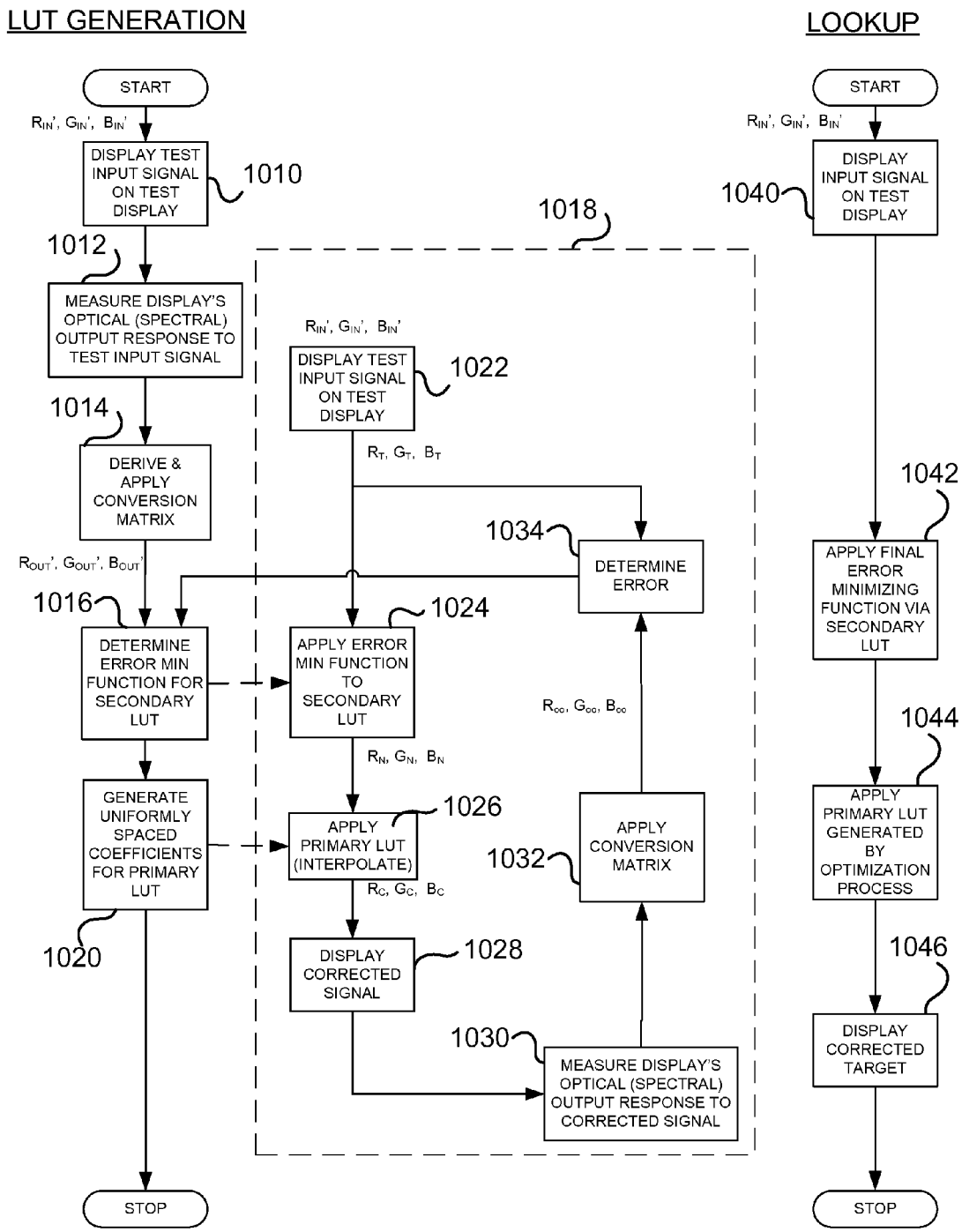
FIG. 19 is a flowchart depiction of a technique for generating primary and secondary LUTs which are independent of a display system's inverse response, and for utilizing the LUTs to perform lookup operations.

FIG. 19 is a flow chart in which blocks 1010-1034 depict a generalized method for generating primary and secondary LUTs like those described above in relation to FIGS. 10-18. Blocks 1040-1046 of FIG. 19 depict a corresponding lookup procedure for a particular display system.

With reference to blocks 1010-1034 of FIG. 19, a series of $R_{in}'$, $B_{in}'$ test input signals selected to represent the full range of the system's R, G, and B display capability are iteratively applied to a test display system (FIG. 19, block 1010). During each iteration, the display's optical output response to each input test signal is measured using a device such as a spectral analyzer (FIG. 19, block 1012). If spectral values are output by the measurement device then they are converted to XYZ tristimulus values using a suitable color matching function. The XYZ tristimulus values corresponding to the maximum R, G and B channels are used to derive an XYZ-to-RGB conversion matrix which is applied (FIG. 19, block 1014) to convert the measured XYZ tristimulus values into $R_{out}'$, $G_{out}'$, and $B_{out}'$ outputs corresponding to the FIG. 19, block 1010 $R_{in}'$, $G_{in}'$, $B_{in}'$ test input signal.

An error minimizing function F( ) is then determined for the secondary LUT using an optimization procedure (FIG. 19, block 1016, and blocks within dashed outline 1018). The indices and coefficients of the secondary LUT can be initialized using arbitrary numeric values (e.g. all ones), or using numeric values corresponding to a simple linear ramp function. Neither the magnitude nor the number of indices or coefficients stored in the secondary LUT need correspond to the magnitude or to the number of indices or coefficients which are to be stored in the primary LUT. Indeed, the number of indices or coefficients which are to be stored in the primary LUT may be an optimization parameter.

Figure 20A:
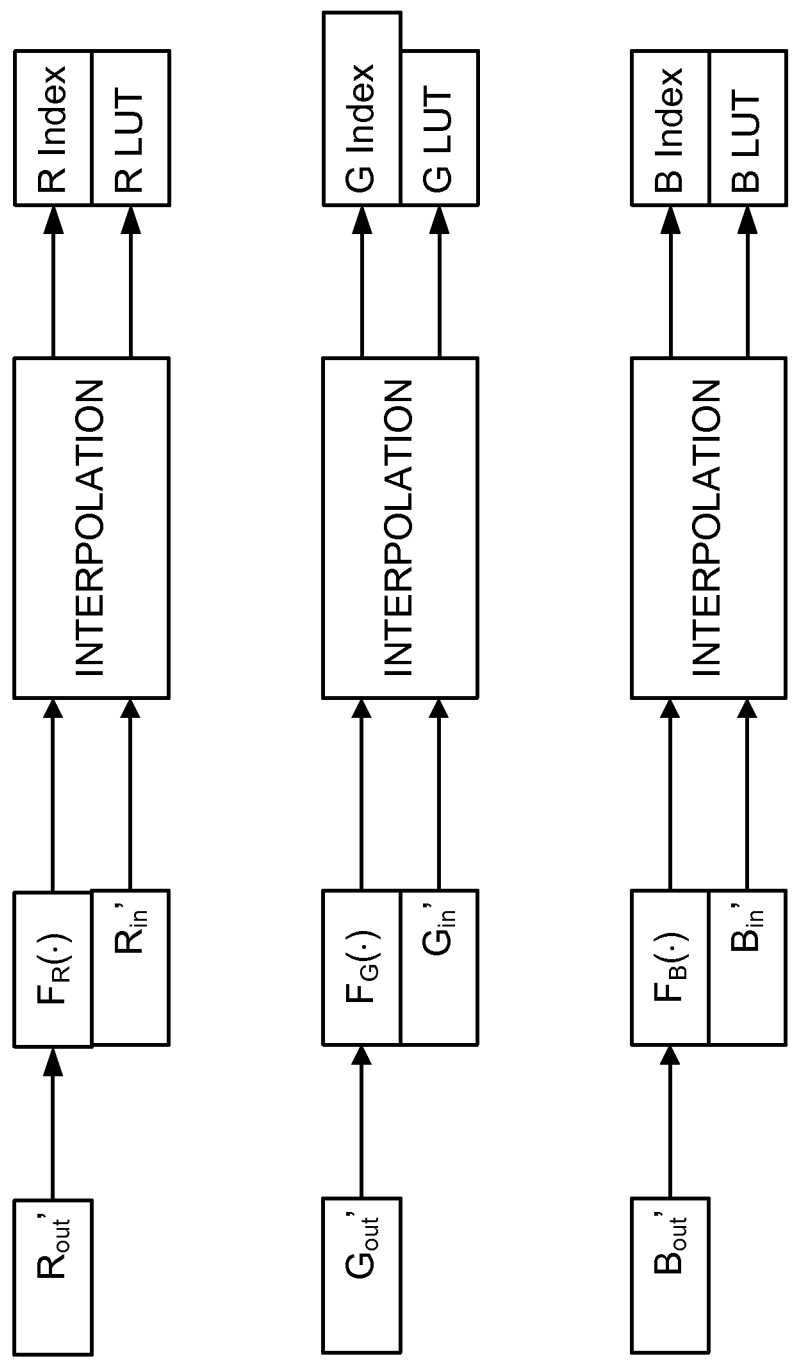
FIG. 20A is a block diagram depicting generation of three 1D LUTs in accordance with the FIG. 19 technique.
Figure 20B:
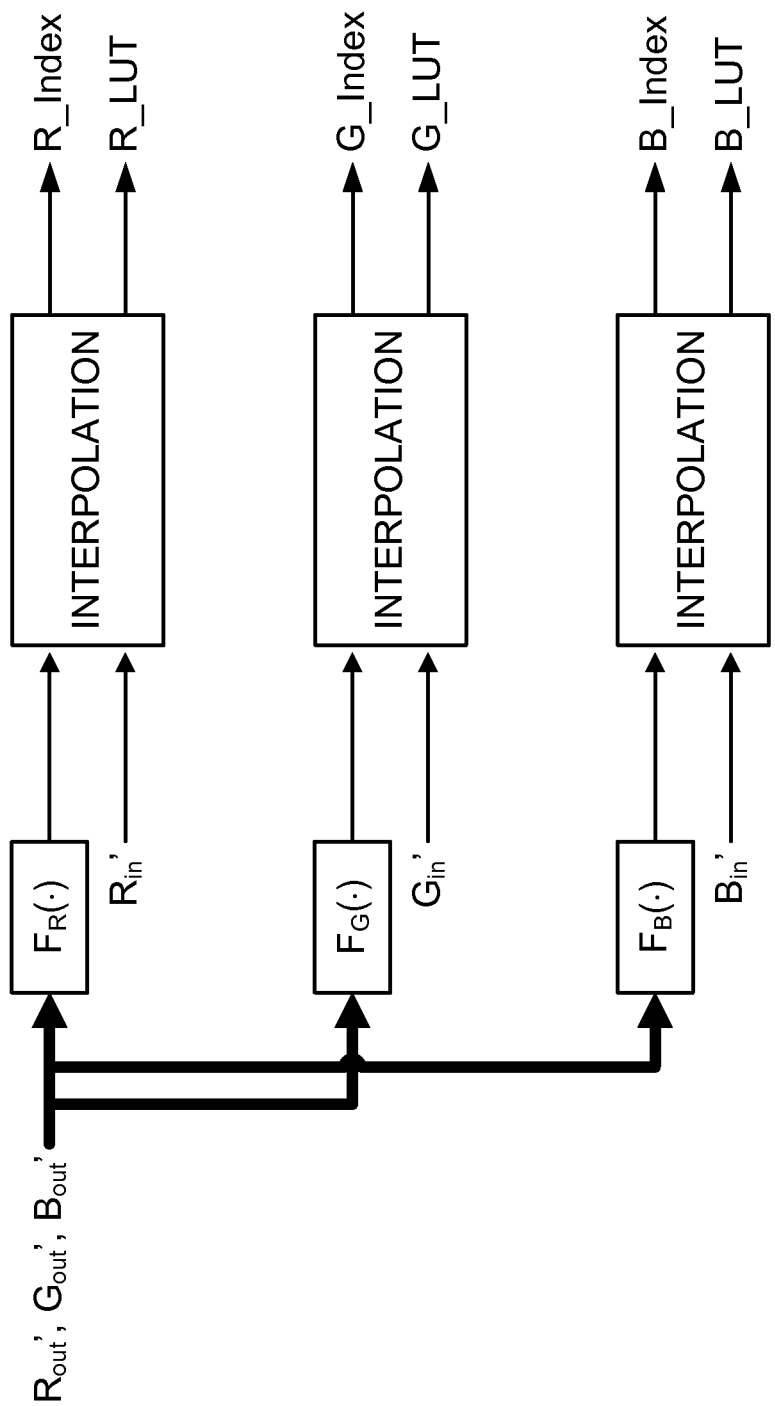
FIG. 20B is a block diagram depicting generation of three 3D LUTs in accordance with the FIG. 19 technique.

The aforementioned $R_{out}'$, $G_{out}'$, $B_{out}'$ values are applied as inputs to the secondary LUT. This modifies the $R_{out}'$, $G_{out}'$, $B_{out}'$ values in a manner which affects the input uniformity of the secondary LUT's response. The coefficients of the primary LUT are then determined by interpolation using uniform sample spacings (FIG. 19, block 1020 and see FIGS. 20A and 20B) yielding uniformly spaced R, G and B coefficients for the primary LUT. As previously explained, LUT lookup operations are more easily performed if the LUT's indices are uniformly spaced.

Figure 21A:
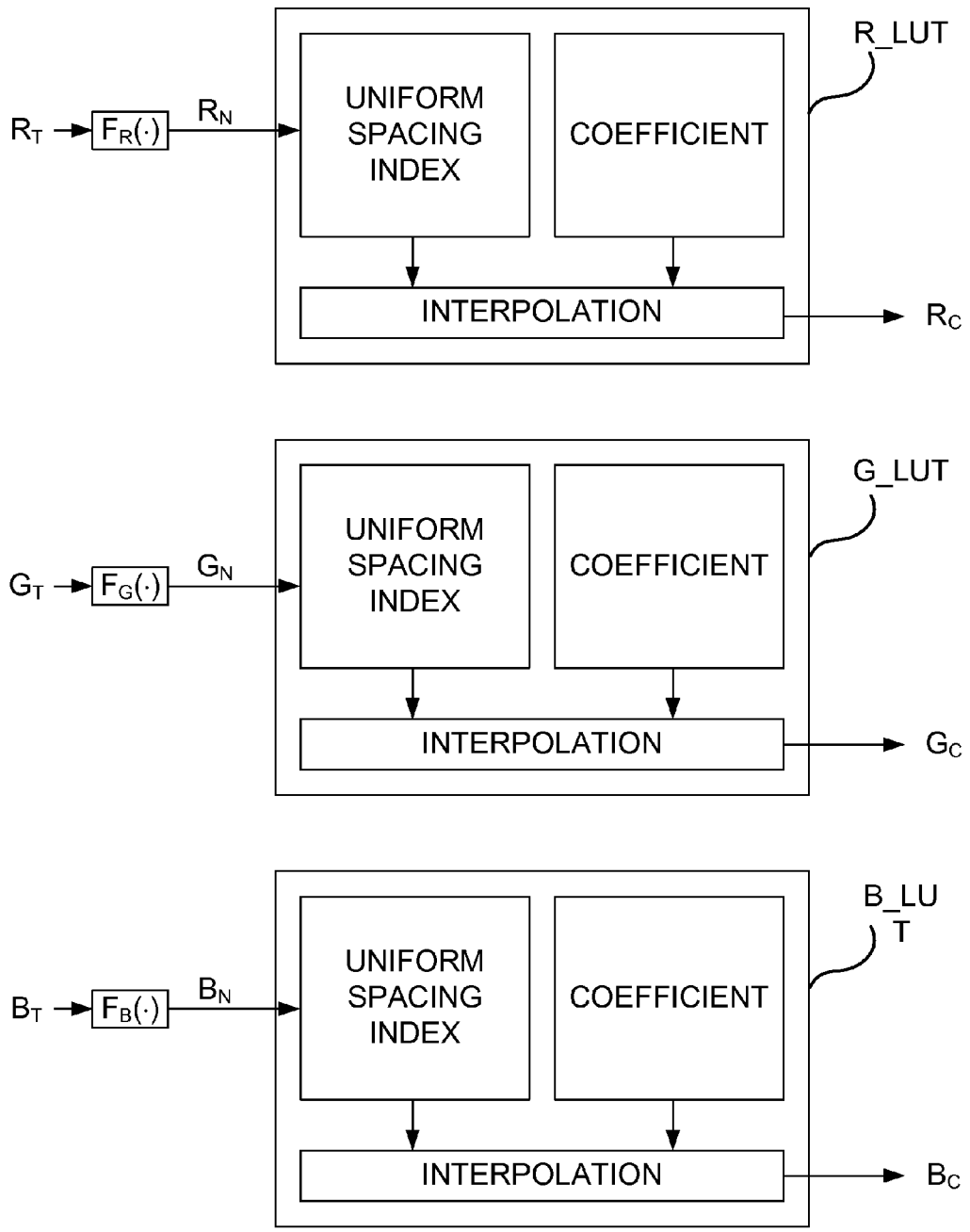
FIG. 21A is a block diagram depicting performance of lookup operations utilizing three 1D LUTs generated in accordance with FIGS. 19 and 20A.
Figure 21B:
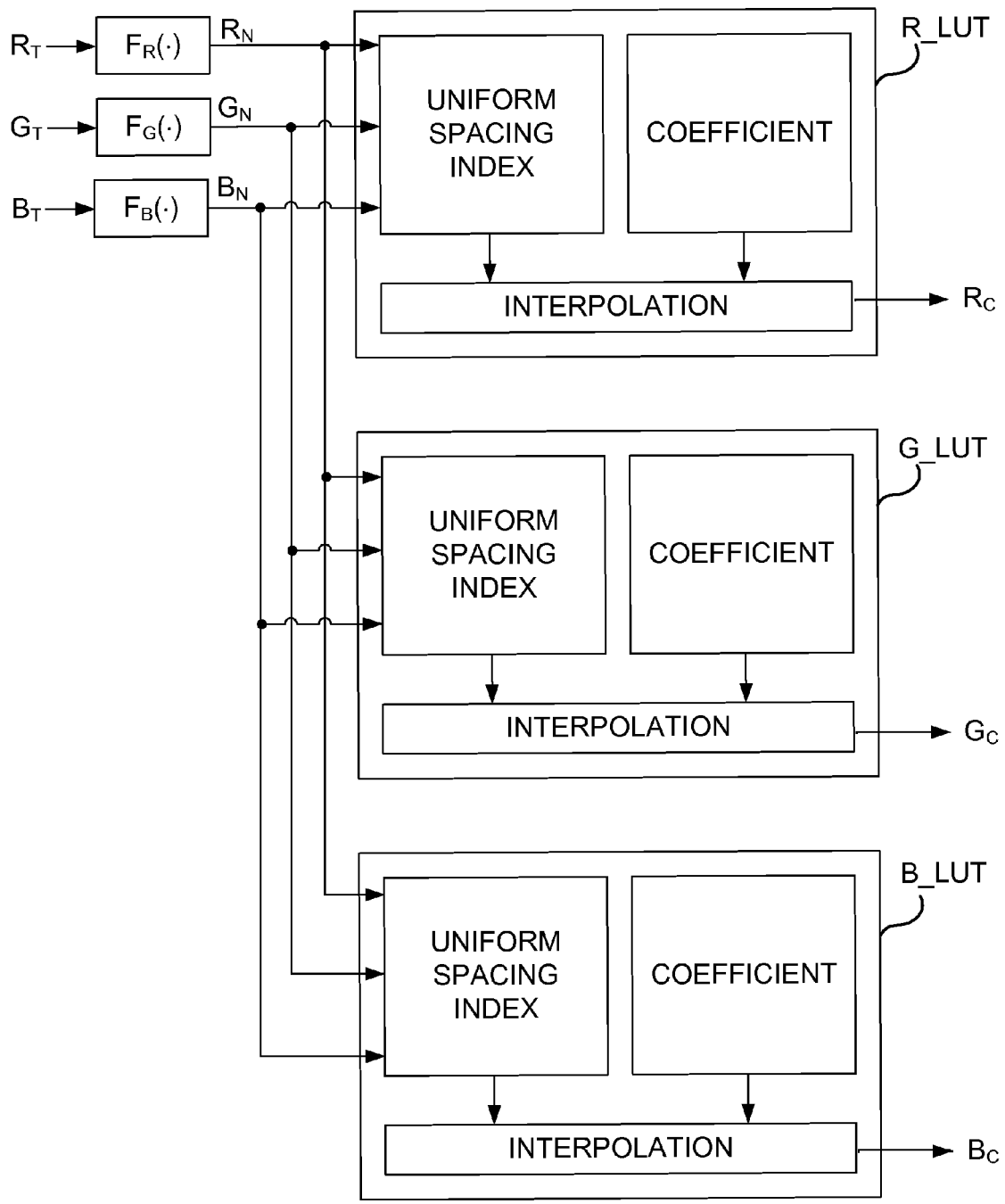
FIG. 21B is a block diagram depicting performance of lookup operations utilizing three 3D LUTs generated in accordance with FIGS. 19 and 20B.

Within the optimization loop (FIG. 19 blocks within dashed outline 1018), the primary LUT is tested using test signals $R_T$, $G_T$, $B_T$ output by the same test display system mentioned above in relation to FIG. 19, block 1010. The current version of the secondary LUT's error minimizing function F( ) (i.e. resulting from the FIG. 19, block 1016 operation) is applied (FIG. 19, block 1024) to the display system's $R_T$, $G_T$, $B_T$ test output signals (and see FIGS. 21A and 21B) to produce indices $R_N$, $G_N$, $B_N$ for the primary LUT. Those indices, together with the uniformly spaced R, G and B coefficients resulting from the FIG. 19, block 1020 operation, are then used by the primary LUT to interpolate corrected output values $R_C$, $G_C$ and $B_C$ (FIG. 19, block 1026).

The $R_C$, $G_C$, and $B_C$ corrected output values are then applied to the test display system (FIG. 19, block 1028) and the display's optical output response to the corrected signal is measured (FIG. 19, block 1030). The optical equipment used to perform the FIG. 19, block 1030 operation need not be the same optical equipment which is used to perform the FIG. 19, block 1012 operation, but the optical equipment used to perform the FIG. 19, block 1030 operation must also be used to verify the lookup procedure. A conversion matrix predetermined to correspond to the optical equipment used to perform the FIG. 19, block 1030 operation is then applied (FIG. 19, block 1032) to convert the display system's measured optical response, i.e. XYZ tristimulus values, into RGB values $R_{oo}$, $G_{oo}$, $B_{oo}$.

The RGB values $R_{oo}$, $G_{oo}$, $B_{oo}$ produced by the FIG. 19, block 1032 operation are then compared to the $R_T$, $G_T$, $B_T$ test signals output by the test display system to determine the error difference therebetween (FIG. 19, block 1034). The error difference is fed back and applied to update the 1D F_LUT error minimizing function F( ). The error may for example be expressed as a coefficient of determination, $R^2$. An $R^2$ value of 1.0 indicates that the $R_{oo}$, $G_{oo}$, $B_{oo}$ values exactly match the $R_T$, $G_T$, $B_T$ test signal values. The above described optimization procedure is iteratively repeated until a predetermined error difference threshold (e.g. a predetermined $R^2$ value) is attained.

The final values of the primary and secondary LUT indices and coefficients can then be applied to perform lookup operations as shown in FIG. 19, blocks 1040-1046. It is not necessary to compute or to have prior knowledge of the inverse system response. However, if a system has a simple gamma-like response, the secondary LUT can be initialized to approximate the inverse system response, as previously described in relation to FIGS. 10-18.

FIG. 19, blocks 1040-1046 depict performance of an LUT lookup operation for a displayed (FIG. 19, block 1040) input signal having $R_{in}$, $G_{in}$, and $B_{in}$ components. The final error minimizing function F( ) produced by iterative repetition of the FIG. 19, block 1018 optimization loop for the secondary LUT is first applied (FIG. 19, block 1042) to the $R_{in}$, $G_{in}$, $B_{in}$ input signal. The output produced by the secondary LUT is then applied to the primary LUT (FIG. 19, block 1044) to produce the corrected target output signal which is to be displayed (FIG. 19, block 1046).

The optimization procedure described above can be applied to obtain a separate error minimizing function $F_R()$ $F_G()$ or $F_B()$ and a corresponding separate secondary LUTs for each one of the R, G and B channels respectively. Alternatively, the same error minimizing function F()(i.e. three identical 1D secondary LUTs) can be applied to the respective R, G and B channels. The interpolation method used in the lookup process could be different than the interpolation method used in the LUT generation process, in which case the optimization process can minimize errors for the two different interpolation methods.

Figure 1A:
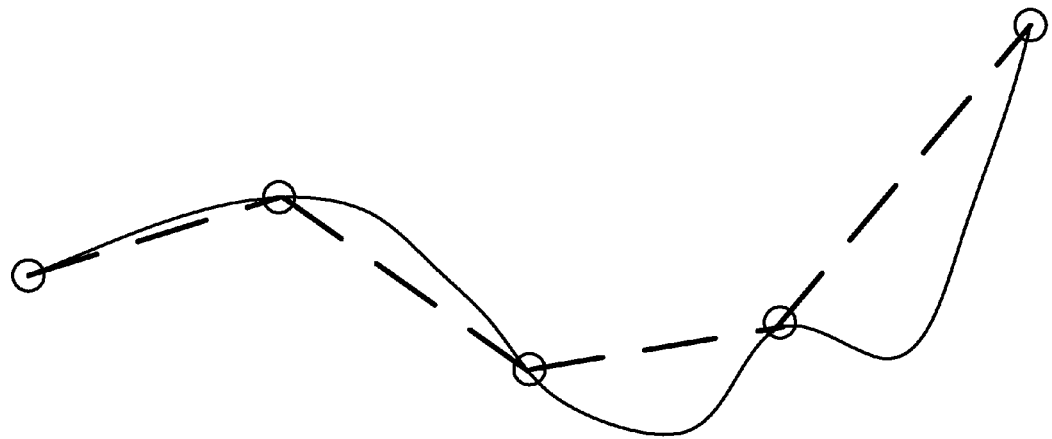
FIGS. 1A and 1B depict prior art uniform and non-uniform sampling techniques respectively.
Figure 1B:
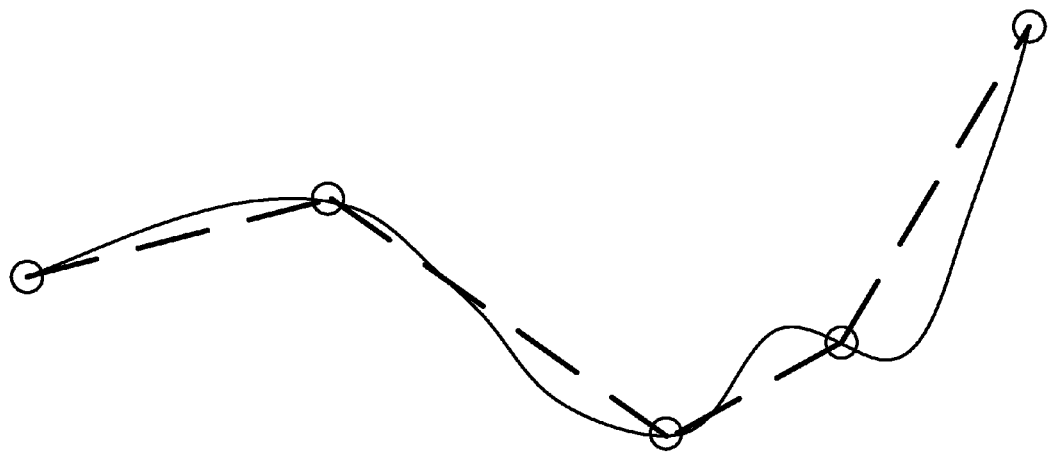
Figure 3:
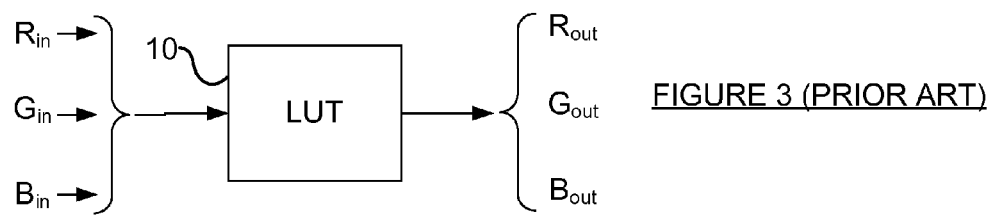
FIG. 3 is a simplified block diagram depiction of a prior art LUT for transforming input color signals into output color signals.
Figure 4A:
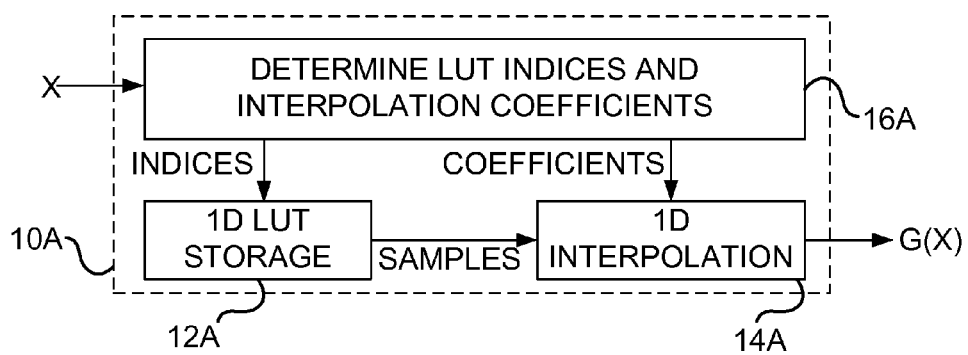
FIGS. 4A and 4B are block diagram depictions of prior art 1D and 3D LUTs respectively.
Figure 4B:
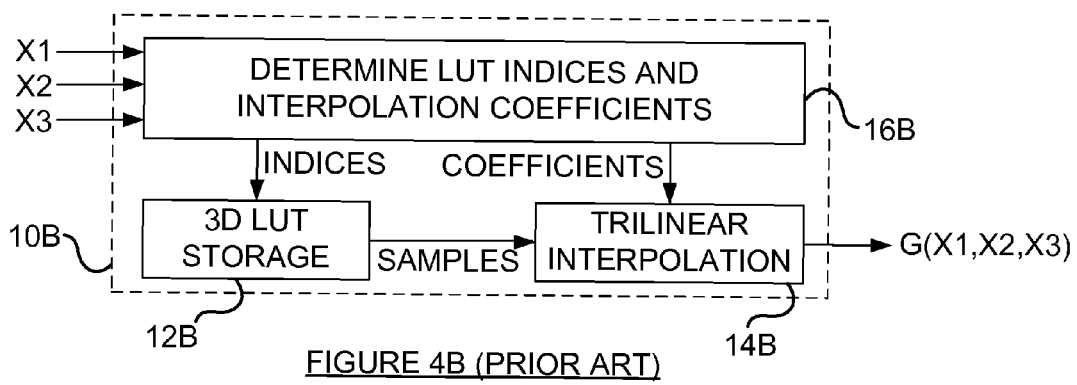
Figure 5:
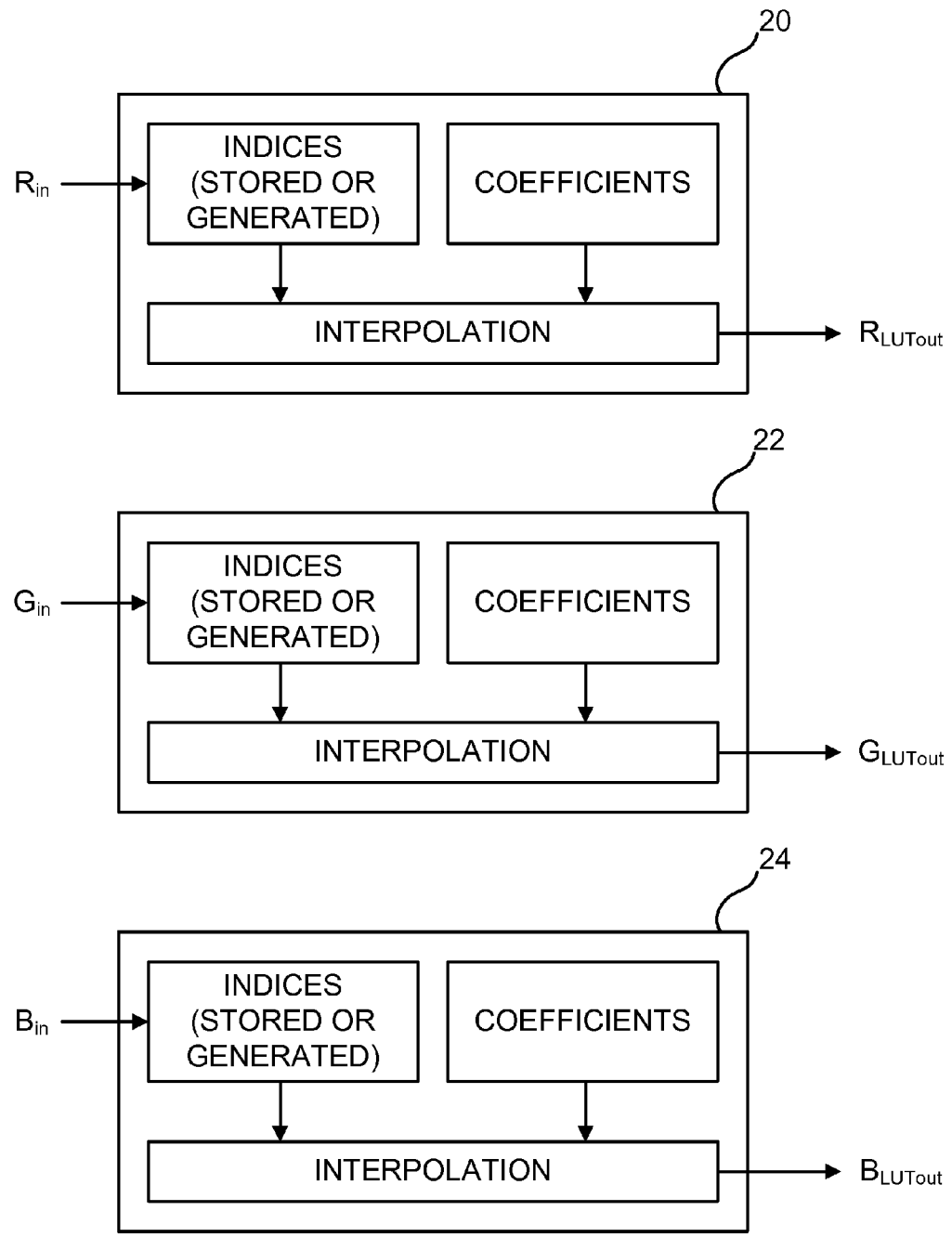
FIG. 5 is a block diagram depiction of a prior art color transformation system incorporating three 1D LUTs.
Figure 6:
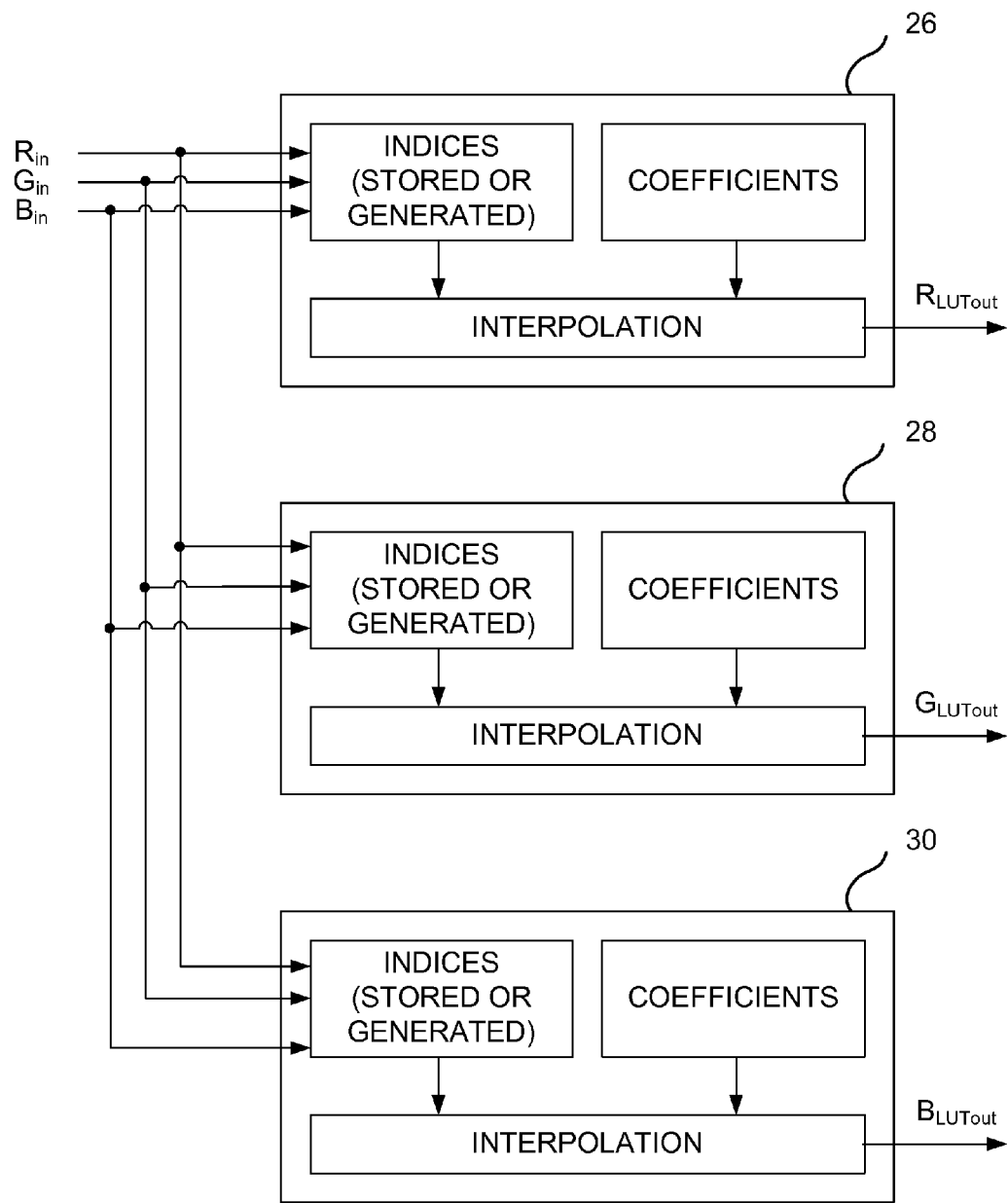
FIG. 6 is a block diagram depiction of a prior art color transformation system incorporating three 3D LUTs.
Figure 7B:
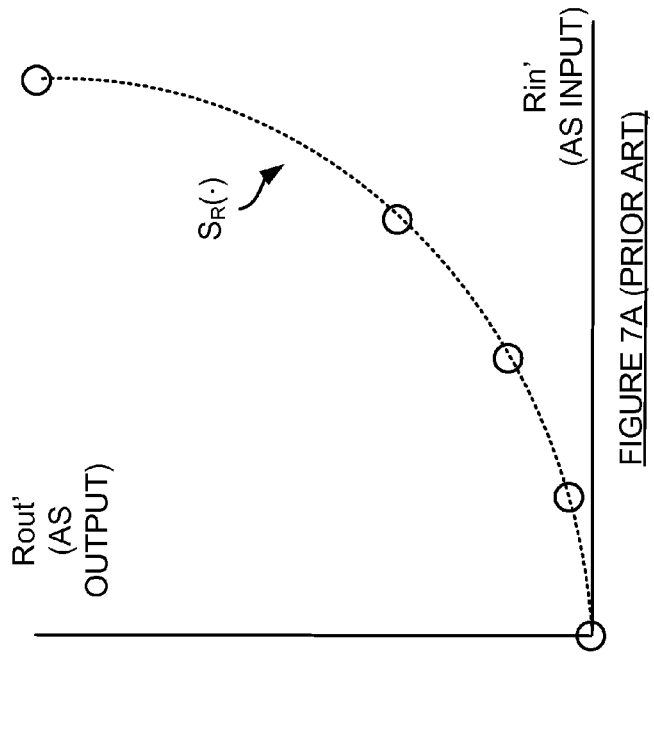
FIGS. 7A through 7D depict approximation errors which can arise if prior art uniform sampling techniques are applied to construct and use an LUT.
Figure 7A:
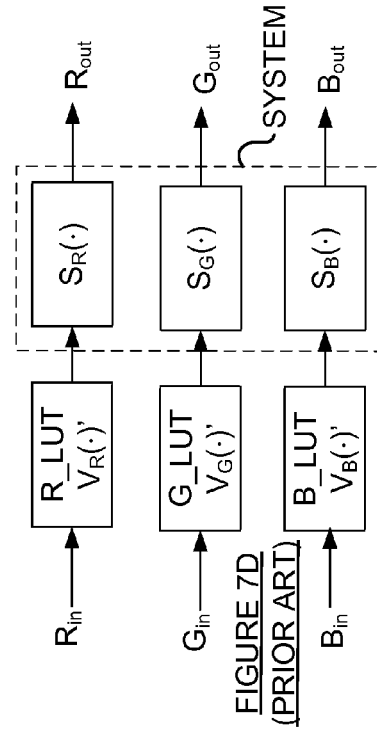
Figure 7C:
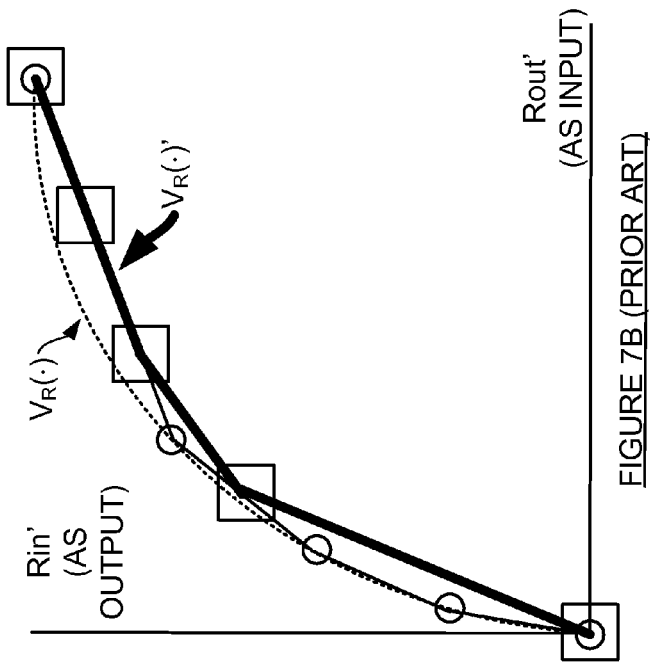
Figure 7D:
Figure 8A:
FIG. 8A depicts a prior art 3D LUT.
Figure 8B:
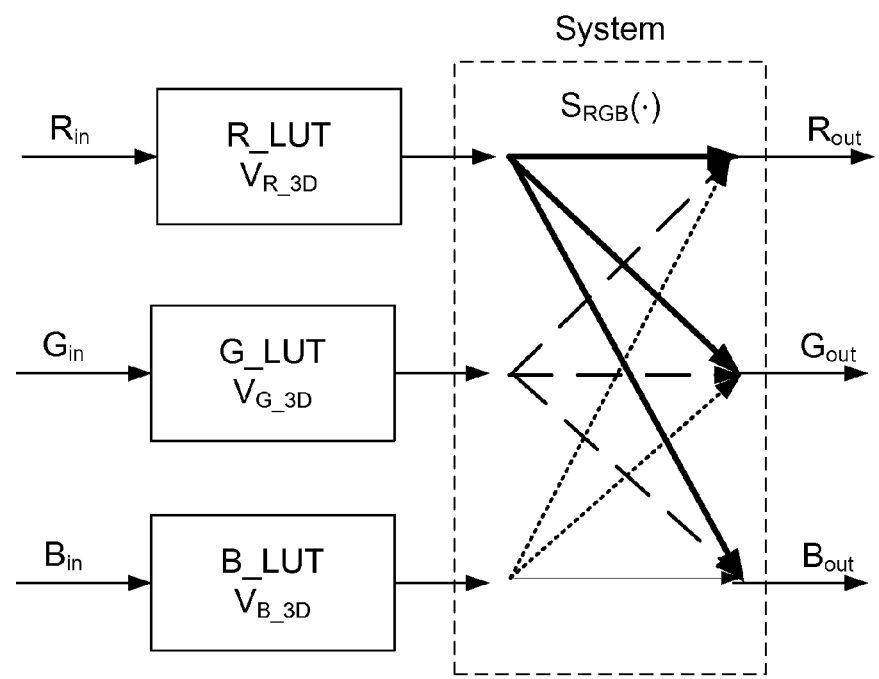
FIG. 8B depicts application to a display system of the FIG. 8A 3D LUT, together with two other 3D LUTs.
Figure 9:
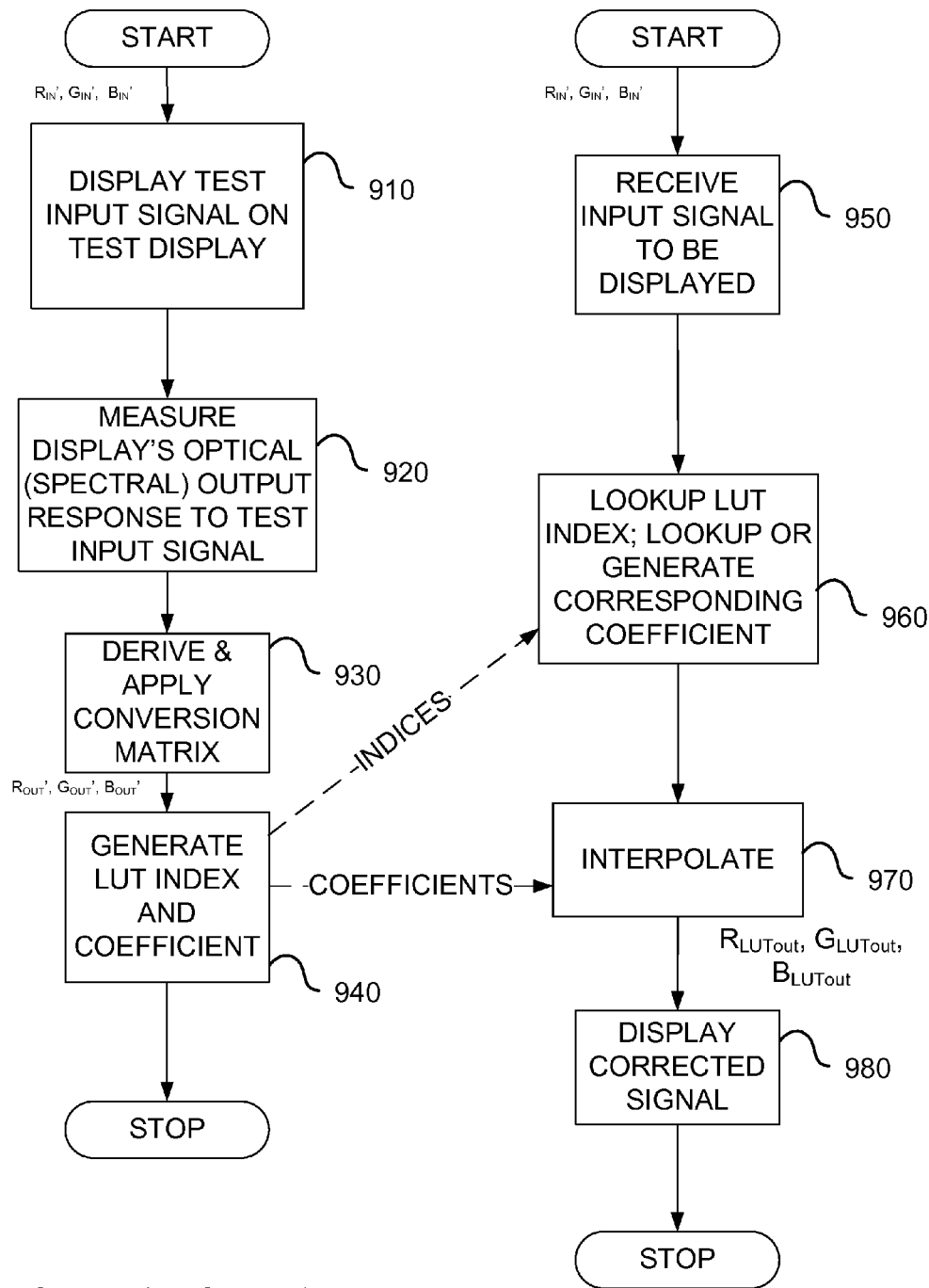
FIG. 9 is a flowchart depiction of a prior art technique for generating an LUT (left column) and for utilizing that LUT to perform lookup operations (right column).

The error minimizing function F() of each R, G and B channel can be different, e.g. the $F_R()$ $F_G()$ and $F_B()$ error minimizing functions shown in FIGS. 20A, 20B, 21A and 21B. Each of the $F_R()$, $F_G()$ and $F_B()$ error minimizing functions can be implemented as a separate 1D LUT, or as a separate algorithmic function. To minimize the error, it is necessary to use the same error minimizing function in both the LUT generation and lookup procedures. For example, the same error minimizing functions ($F_R()$ $F_G()$ and $F_B()$ are used in both the FIG. 21A 1D LUT lookup procedure and in the corresponding FIG. 20A LUT generation process; and the same error minimizing functions ($F_R()$ $F_G()$ and $F_B$ ()) are used in both the FIG. 21B 3D LUT lookup process and in the corresponding FIG. 20B 3D LUT generation procedure.

Figure 22:
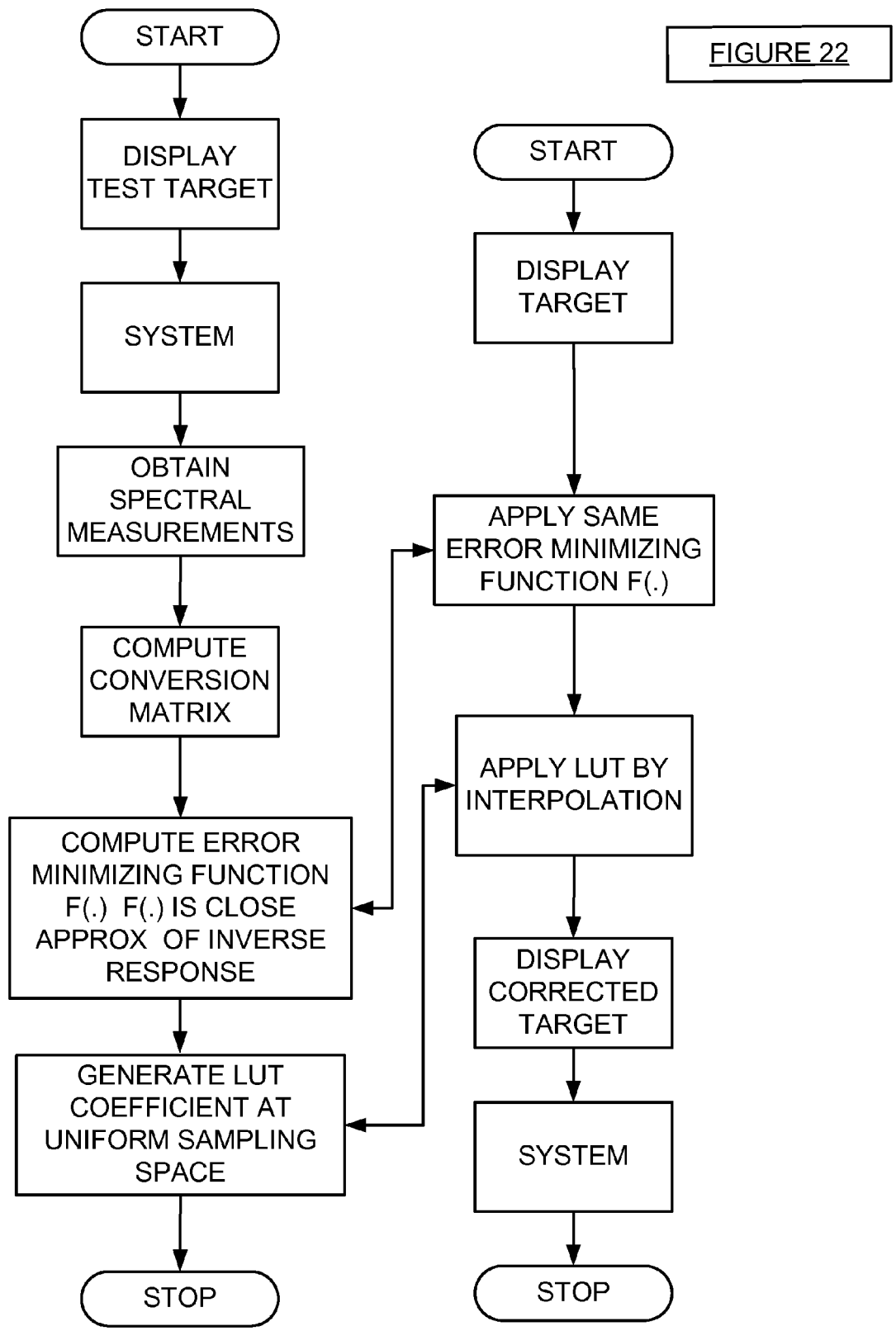
FIG. 22 is a flowchart depiction of a technique for generating an LUT based on a display system's inverse system response, and for utilizing that LUT to perform lookup operations.

It can thus be seen that non-uniform interpolation is achieved through the combined effects of an error minimizing function F() to adjust the uniformity of the secondary LUT's indices, and a primary LUT based on uniform sampling spaces. In FIG. 22, a close approximation of the inverse system response is used as the error minimizing function F() The error minimizing function F() can be implemented as 1D LUT or an algorithm formula. An improvement in LUT accuracy based on a uniform sampling space LUT can be achieved by applying the same error minimizing function F() in the lookup process, in which case an optimization procedure is not required.

Non-Linearity Error Reduction—Example Method and Apparatus 2

Whereas the first method described above utilizes a series combination of primary and secondary LUTs, the second method utilizes a parallel combination of an LUT with another LUT, or with a processor which performs a mathematical operation. Specifically, in the second method, the output H of an LUT is multiplied by a value P, and an optional constant offset value C is added to the multiplication result to yield an output G. The multiplicand P may for example be derived as the output of a second LUT connected in parallel with the first LUT, or as the output of a processor connected in parallel with the first LUT.

Figure 2B:
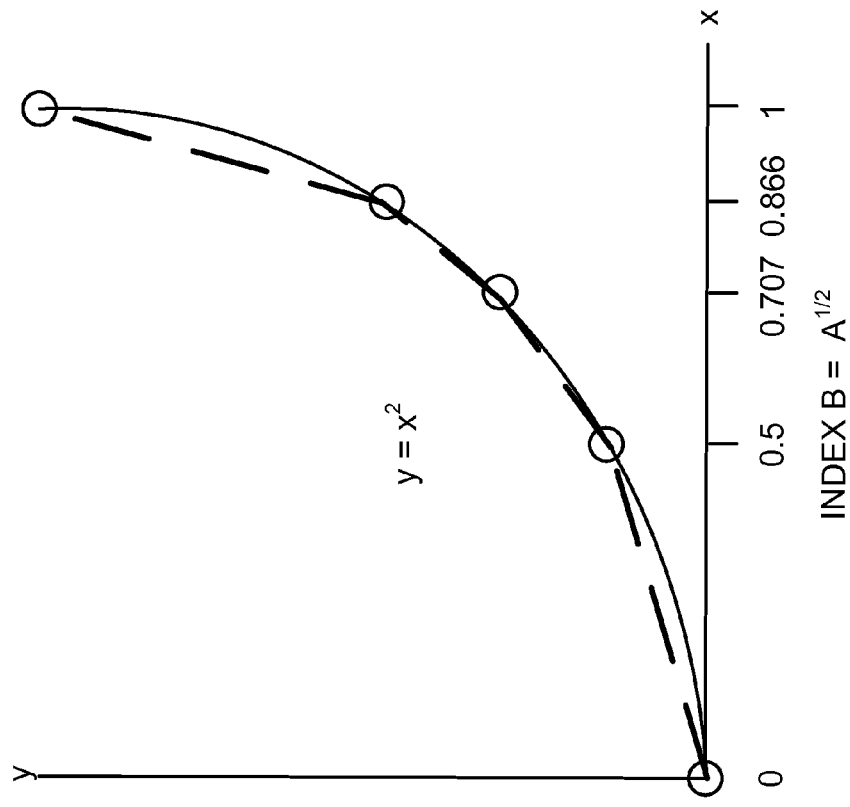
FIG. 2B depicts a prior art non-uniform sampling technique based on a display system's inverse response characteristic.
Figure 2A:
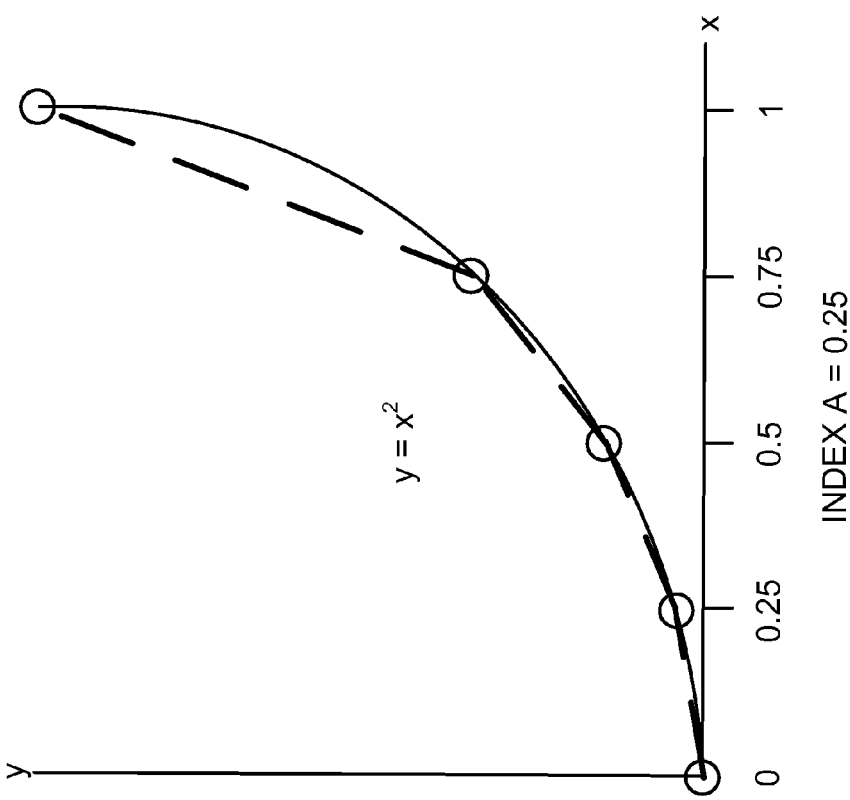
FIG. 2A depicts a prior art uniform sampling technique.
Figure 23:
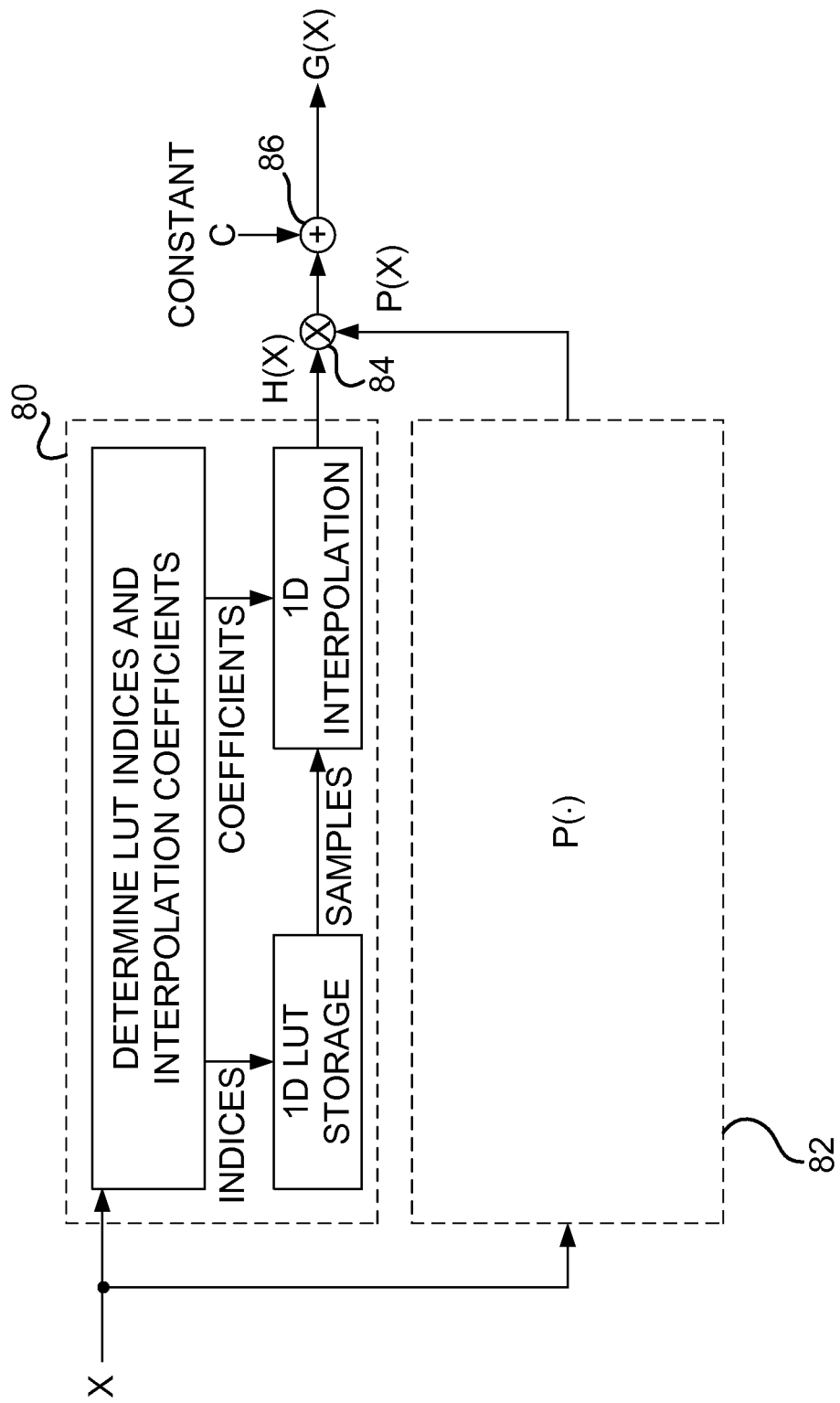
FIG. 23 is a generalized block diagram depiction of a second technique for transforming input color signals into output color signals, utilizing a 1D LUT and a processor (which may be another LUT).

FIG. 23 depicts the second method in a 1D LUT context. 1D LUT module 80 implements 1D interpolation to apply a first function H() to transform input signal X into a first output signal H(X) as previously described in relation to 1D LUT module 10A shown in FIG. 2A. Module 82, which may be either a second 1D LUT or a processor which performs a mathematical operation, applies a second function P() to transform the input signal X into a second output signal P(X). Multiplier 84 multiplies first output signal H(X) with second output signal P(X). Adder 86 adds an optional range-shifting constant C to multiplier 84's H(X)·P(X) output product to produce the final output G(X)=H(X)·P(X)+C.

Figure 24:
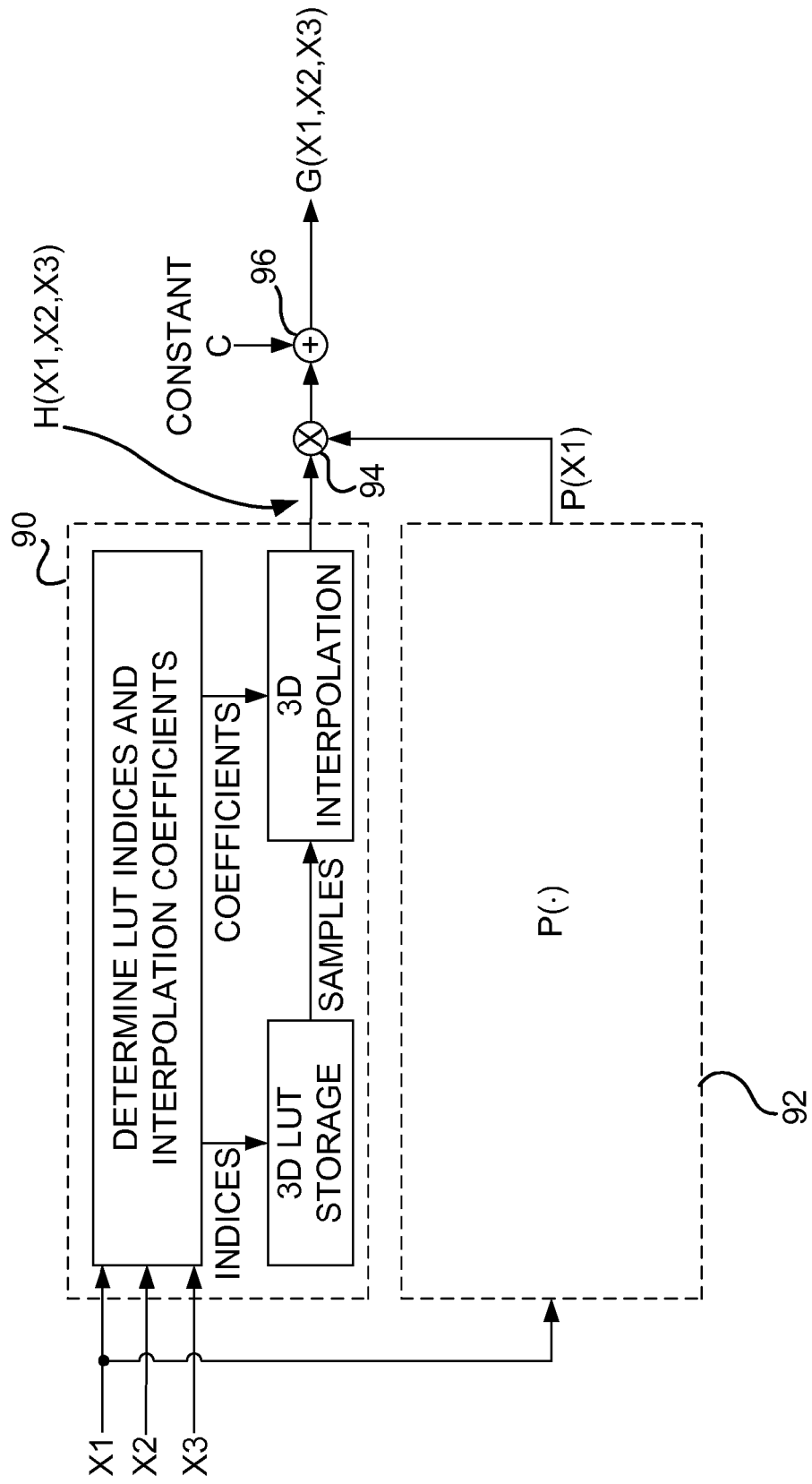
FIG. 24 is a generalized block diagram depiction of the second technique, utilizing a 3D LUT and a processor (which may be another LUT).

FIG. 24 depicts the second method in a 3D LUT context. 3D LUT module 90 implements 3D interpolation to apply a first function H() to transform three input signals X1,X2,X3 into a first output signal H(X1,X2,X3) as previously described in relation to 3D LUT module 10B shown in FIG. 2B. Module 92, which may be either an 1D LUT or a processor which performs a mathematical operation, applies a second function P() to transform one of the three input signals (in this example, input signal X1) into a second output signal P(X1). Multiplier 94 multiplies first output signal H(X1,X2, X3) with second output signal P(X1). Adder 96 adds an optional range-shifting constant C to multiplier 94's H(X1, X2,X3)·P(X1) output product to produce the final output G(X1,X2,X3)=H(X1,X2,X3)·P(X1)+C.

Figure 34:
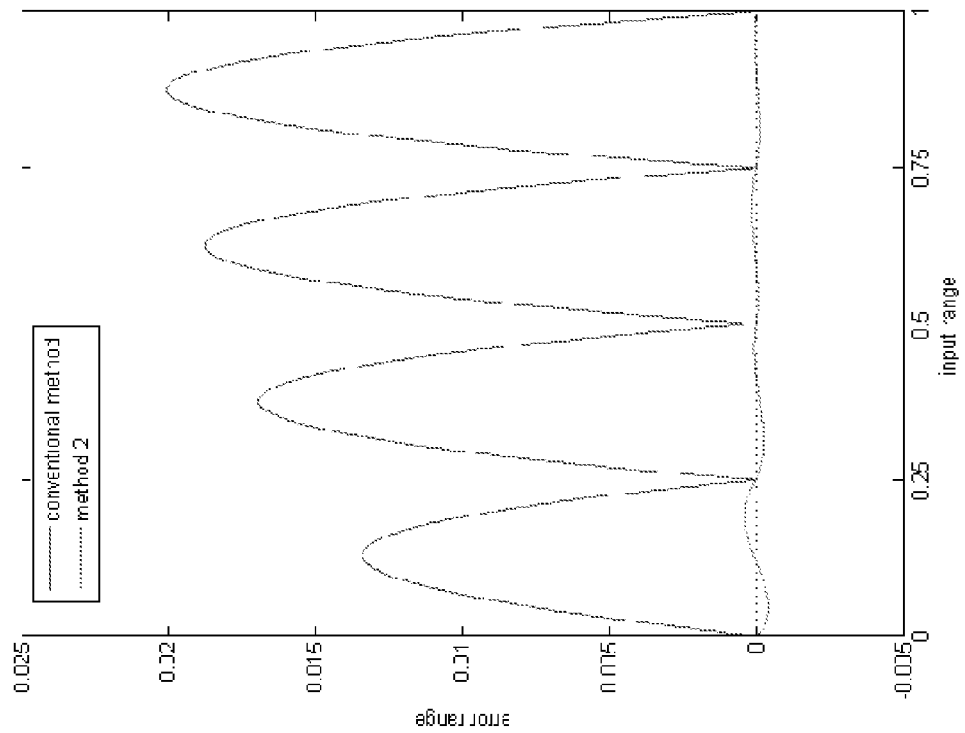
FIG. 34 graphically depicts the error difference between the FIG. 33 reference function and the FIG. 33 output values produced by a prior art LUT module.
Figure 33:
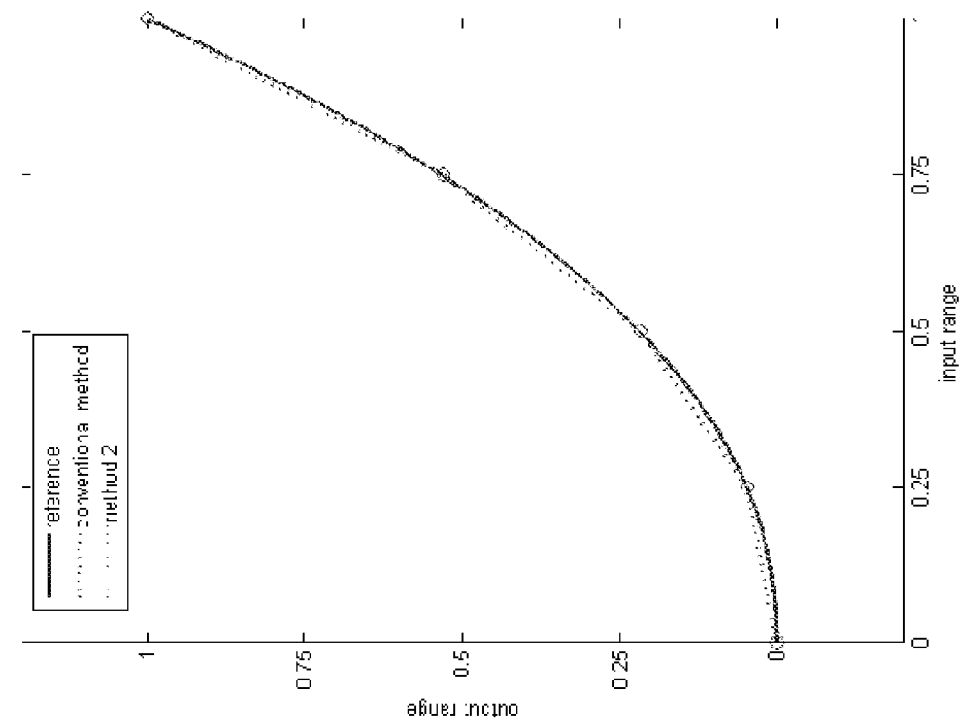
FIG. 33 graphically compares (1) a predefined reference function, (2) output values approximating the reference function produced by a prior art LUT module, and (3) output values approximating the reference function produced by an LUT module corresponding to a FIG. 23 embodiment in which the processor is a 1D LUT configured to implement a "Gamma of 2.2" reference function for an input domain between 0 to 1.
Figure 35:
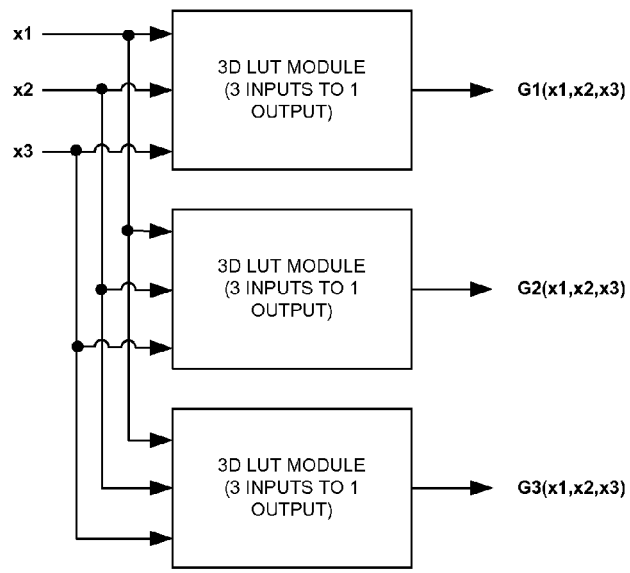
FIG. 35 is a block diagram depiction of a prior art system incorporating three 3D LUTs, each having three inputs and one output.
Figure 36:
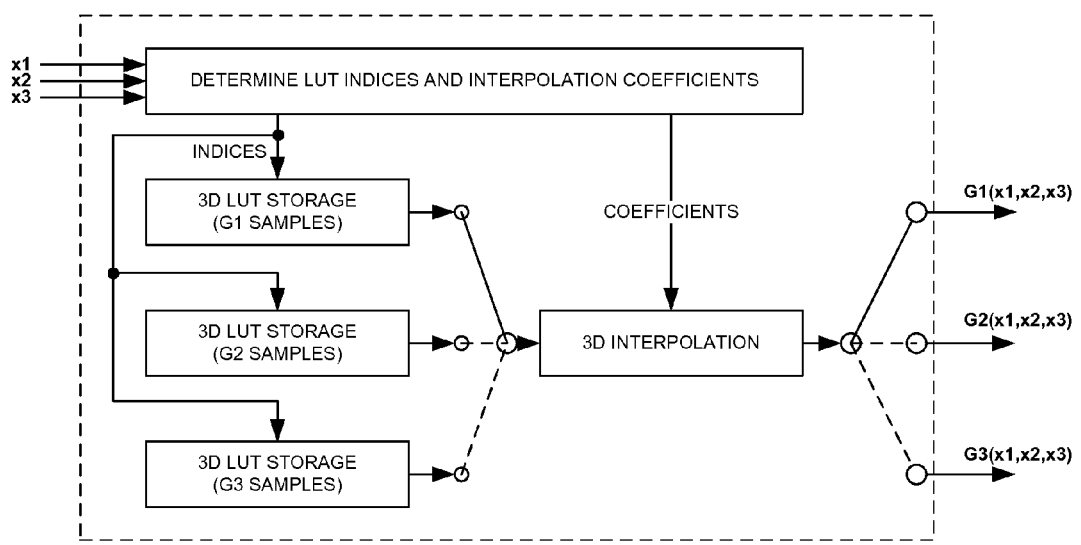
FIG. 36 is a block diagram depiction of an alternative system incorporating three 3D LUTs, each having three inputs and one output.

The optional range-shifting constant C is useful in reducing errors which can result if the second method is used to perform operations corresponding to some reference functions. The value selected for C depends on the reference function's values at various sample locations. For example, assume a reference function "Gamma of 2.2" as shown in FIG. 33; an input domain 0x 1 where x is the input value; five input sample values x=0, 0.25, 0.5, 0.75 and 1; and a range-shifting constant value C=0.125. As shown in FIG. 34, the resultant error range oscillates about the horizontal (i.e. zero) axis, in comparison to the positive (but highly variable) values produced by conventional methodology.

Without a range shifting constant (i.e. assuming C=0), the value of H(x=0), or P(x=0), or both, must be zero or else the (P()·((H() product is non-zero for the "Gamma of 2.2" reference function at x=0. As seen in FIG. 34, without a range shifting constant, the resultant error distribution is biased to yield all positive or all negative values for the first input interval (0 x 0.25) because samples P(x=0.25) and H(x=0.25) should remain positive to better approximate the reference function in that interval. By choosing C=0.125 in this example, the resultant P() and H() values may be negative, and consequently the (P() ((H() product can be either positive or negative. Since the "Gamma of 2.2" reference function is non-negative throughout the 0 x 1 input domain, addition of a suitable range-shifting constant C ensures that the final result has a positive value.

Figure 25:
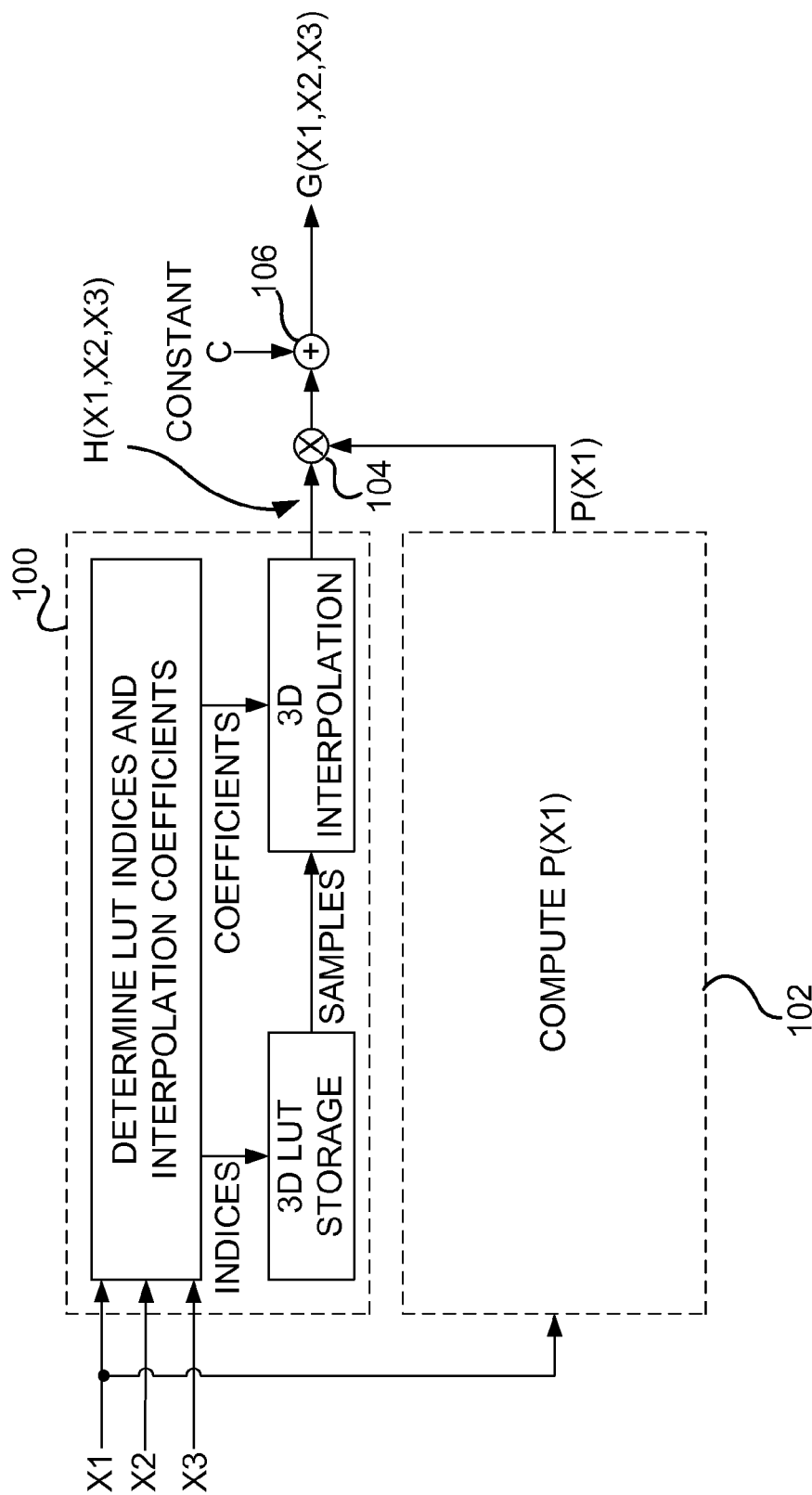
FIG. 25 is a block diagram depiction of a first embodiment of the second technique, utilizing a 3D LUT and a module which computes a function P( ).

FIG. 25 depicts a first embodiment of the second method in a 3D LUT context. 3D LUT module 100 implements 3D interpolation to apply a first function H() to transform three input signals X1,X2,X3 into a first output signal H(X1,X2, X3) as previously described in relation to 3D LUT module 10B shown in FIG. 2B. Module 102, which may be either an 1D LUT or a processor which performs a mathematical operation, applies a second function P() to transform one of the three input signals (in this example, input signal X1) into a second output signal P(X1). Multiplier 104 multiplies first output signal H(X1,X2,X3) with second output signal P(X1). Adder 106 adds an optional range-shifting constant C to multiplier 104's H(X1,X2,X3)·P(X1) output product to produce the final output G(X1,X2,X3)=H(X1,X2,X3)·P(X1)+C.

Figure 26:
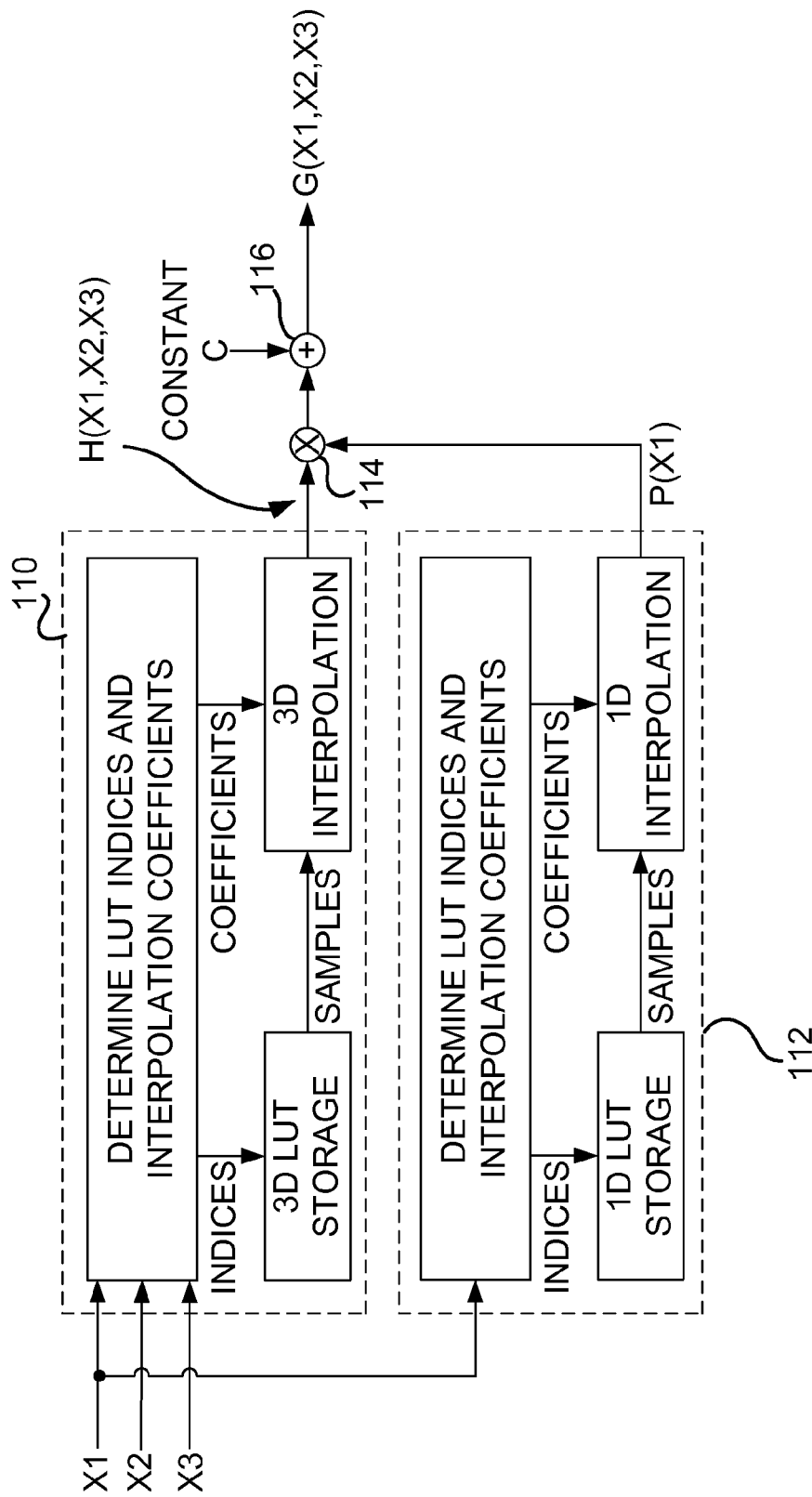
FIG. 26 is a block diagram depiction of a second embodiment of the second technique, utilizing a 3D LUT and a 1D LUT.

FIG. 26 depicts a second embodiment of the second method in a 3D LUT context. 3D LUT module 110 implements 3D interpolation to apply a first function H() to transform three input signals X1,X2,X3 into a first output signal H(X1,X2,X3) as previously described in relation to 3D LUT module 10B shown in FIG. 2B. 1D LUT module 112 implements 1D interpolation to apply a second function P() to transform one of the three input signals (in this example, input signal X1) into a second output signal P(X1). Multiplier 114 multiplies first output signal H(X1,X2,X3) with second output signal P(X1). Adder 116 adds an optional range-shifting constant C to multiplier 114's H(X1,X2,X3)·P(X1) output product to produce the final output G(X1,X2,X3)=H(X1,X2,X3)·P(X1)+C. The FIG. 26 embodiment achieves improved accuracy through second order interpolation of the input signal which is common to both 3D LUT module 110 and 1D LUT module 112 (in this example, input signal X1).

Figure 27:
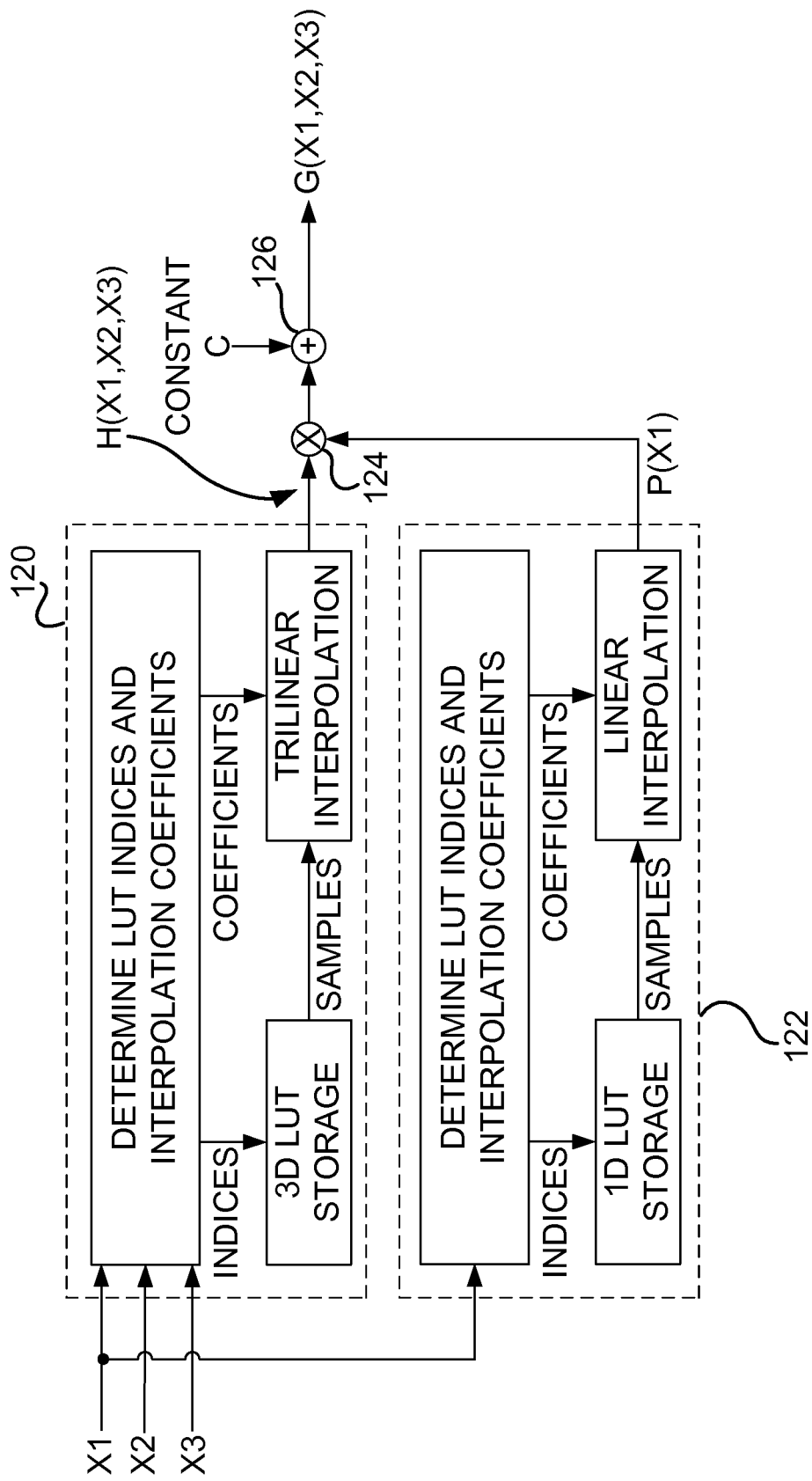
FIG. 27 is a block diagram depiction of a third embodiment of the second technique, utilizing a 3D LUT and a 1D LUT.

FIG. 27 depicts a third embodiment of the second method in a 3D LUT context. 3D LUT module 120 implements trilinear interpolation to apply a first function H() to transform three input signals X1,X2,X3 into a first output signal H(X1,X2,X3) as previously described in relation to 3D LUT module 10B shown in FIG. 2B. 1D LUT module 122 implements linear interpolation to apply a second function P() to transform one of the three input signals (in this example, input signal X1) into a second output signal P(X1). Multiplier 124 multiplies first output signal H(X1,X2,X3) with second output signal P(X1). Adder 126 adds an optional range-shifting constant C to multiplier 124's H(X1,X2,X3)·P(X1) output product to produce the final output G(X1,X2,X3)=H(X1,X2,X3)·P(X1)+C. The FIG. 27 embodiment achieves improved accuracy through second order interpolation of the input signal which is common to both 3D LUT module 120 and 1D LUT module 122 (in this example, input signal X1).

Figure 28:
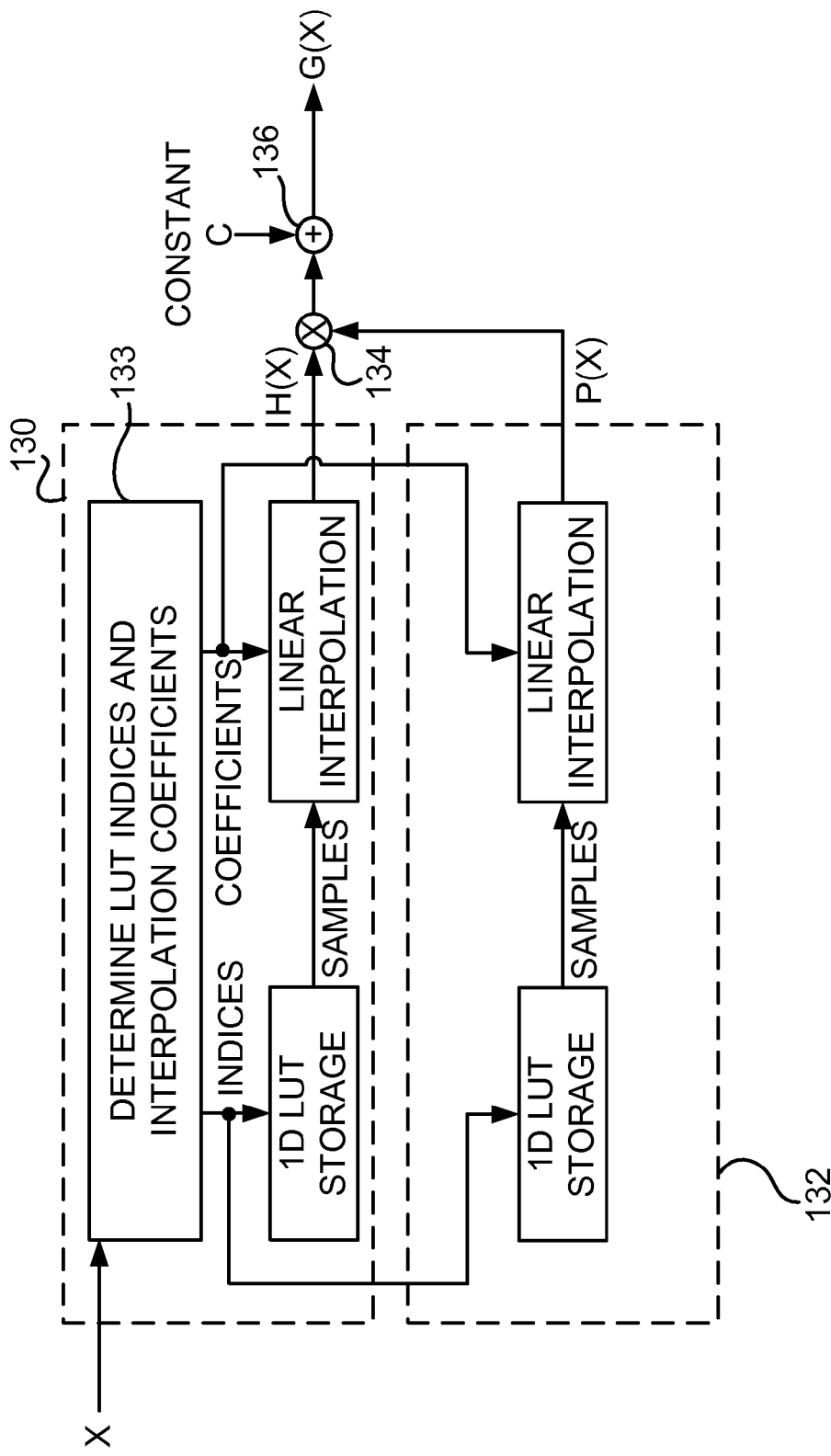
FIG. 28 is a block diagram depiction of a fourth embodiment of the second technique, utilizing a 1D LUT and a partial 1D LUT.

FIG. 28 depicts a fourth embodiment of the second method in a 1D LUT context. A first 1D LUT module 130 implements linear interpolation to apply a first function H() to transform input signal X into a first output signal H(X) as previously described in relation to 1D LUT module 10A shown in FIG. 2A. A second, partial, 1D LUT module 132 is connected to receive the indices and coefficients generated by first 1D LUT module 130's control component 133. Second 1D LUT module 132 does not require a separate control component because the indices and coefficients generated by first 1D LUT module 130's control component 133 sufficiently characterize the input signal for utilization by second, partial, 1D LUT module 132. Second 1D LUT module 132 implements linear interpolation to apply a second function P() to transform the input signal X into a second output signal P(X). Multiplier 134 multiplies first output signal H(X) with second output signal P(X). Adder 136 adds an optional range-shifting constant C to multiplier 134's H(X)·P(X) output product to produce the final output G(X)=H(X)·P(X)+C. The FIG. 28 embodiment achieves improved accuracy through second order interpolation of the input signal which is common to both 3D LUT module 130 and 1D LUT module 132 (in this example, input signal X1), without redundant determination of indices and coefficients by both of LUT modules 130, 132.

Figure 29:
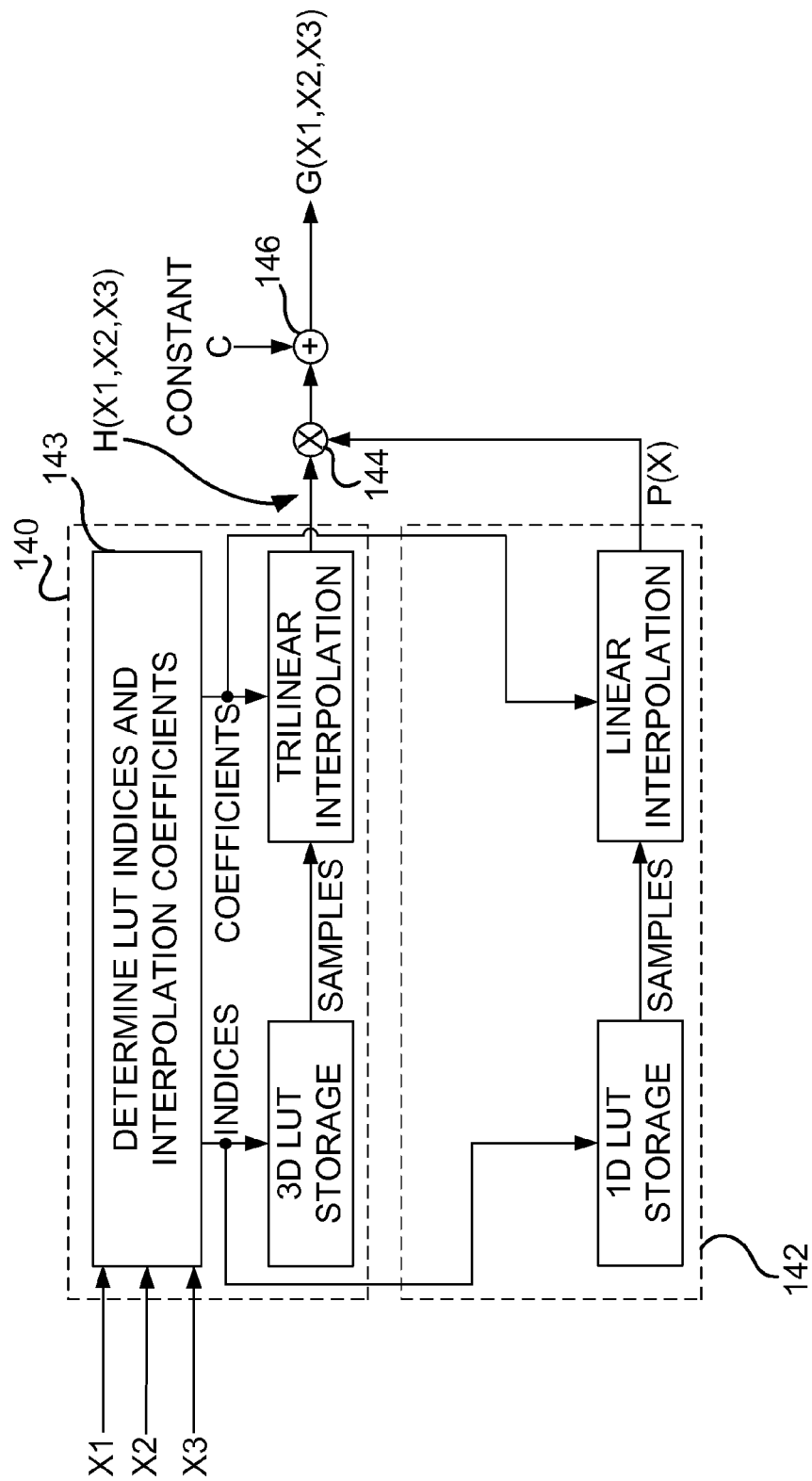
FIG. 29 is a block diagram depiction of a fifth embodiment of the second technique, utilizing a 3D LUT and a partial 1D LUT.

FIG. 29 depicts a fifth embodiment of the second method in a 3D LUT context. 3D LUT module 140 implements trilinear interpolation to apply a first function H() to transform three input signals X1,X2,X3 into a first output signal H(X1,X2,X3) as previously described in relation to 3D LUT module 10B shown in FIG. 2B. Partial 1D LUT module 142 is connected to receive the indices and coefficients generated by first 3D LUT module 140's control component 143 (i.e. 1D LUT module 142 does not require a separate control component). 1D LUT module 142 implements linear interpolation to apply a second function P() to transform the input signal X into a second output signal P(X). Multiplier 144 multiplies first output signal H(X1,X2,X3) with second output signal P(X1). Adder 146 adds an optional range-shifting constant C to multiplier 144's H(X1,X2,X3)·P(X1) output product to produce the final output G(X1,X2,X3)=H(X1,X2,X3)·P(X1)+C. The FIG. 29 embodiment achieves improved accuracy through second order interpolation of the input signal, without redundant determination of indices and coefficients by both of LUT modules 140, 142.

The number of samples stored in an LUT determines the LUT's memory storage requirement. In the 1D LUT context, computational efficiency (e.g. avoidance of redundant determination of indices and coefficients) and reduced storage requirements can be achieved by using two LUTs having the same size, if the number of sample values stored for use by the P(X) and H(X) functions is the same for both LUTs. In the 3D LUT context, the number of samples stored for each one of the three 3D domain axes determines the 3D LUT's memory storage requirement. In the embodiment shown in FIG. 24, H() is a function of 3 inputs approximated by 3D LUT module 90, requiring determination of indices for each one of the 3 axes (x1,x2,x3) to facilitate retrieval of a corresponding sample value from 3D LUT module 90's storage component. The function P() operates on only one input (i.e. X1) and requires storage of a number of samples equal to the number of samples stored for the x1 axis of 3D LUT module 90. Therefore, the indices for the x1 axis as determined by 3D LUT module 90 can be shared with a 1D LUT used to implement the function P() in the FIG. 24 embodiment.

If a 3D LUT module and a 1D LUT module perform first order interpolation (e.g. trilinear interpolation performed by the 3D LUT module and linear interpolation performed by the 1D LUT module) utilizing interpolation samples based on coefficients derived for the x1 axis as determined only by the input value x1 relative to the nearest sample locations for stored data in the 3D LUT and 1D LUT having matching size and sample locations, then the interpolation coefficients corresponding to the x1 axis as determined for the 3D LUT module can be shared to avoid redundant recalculation of those coefficients by the 1D LUT module.

Figure 30:
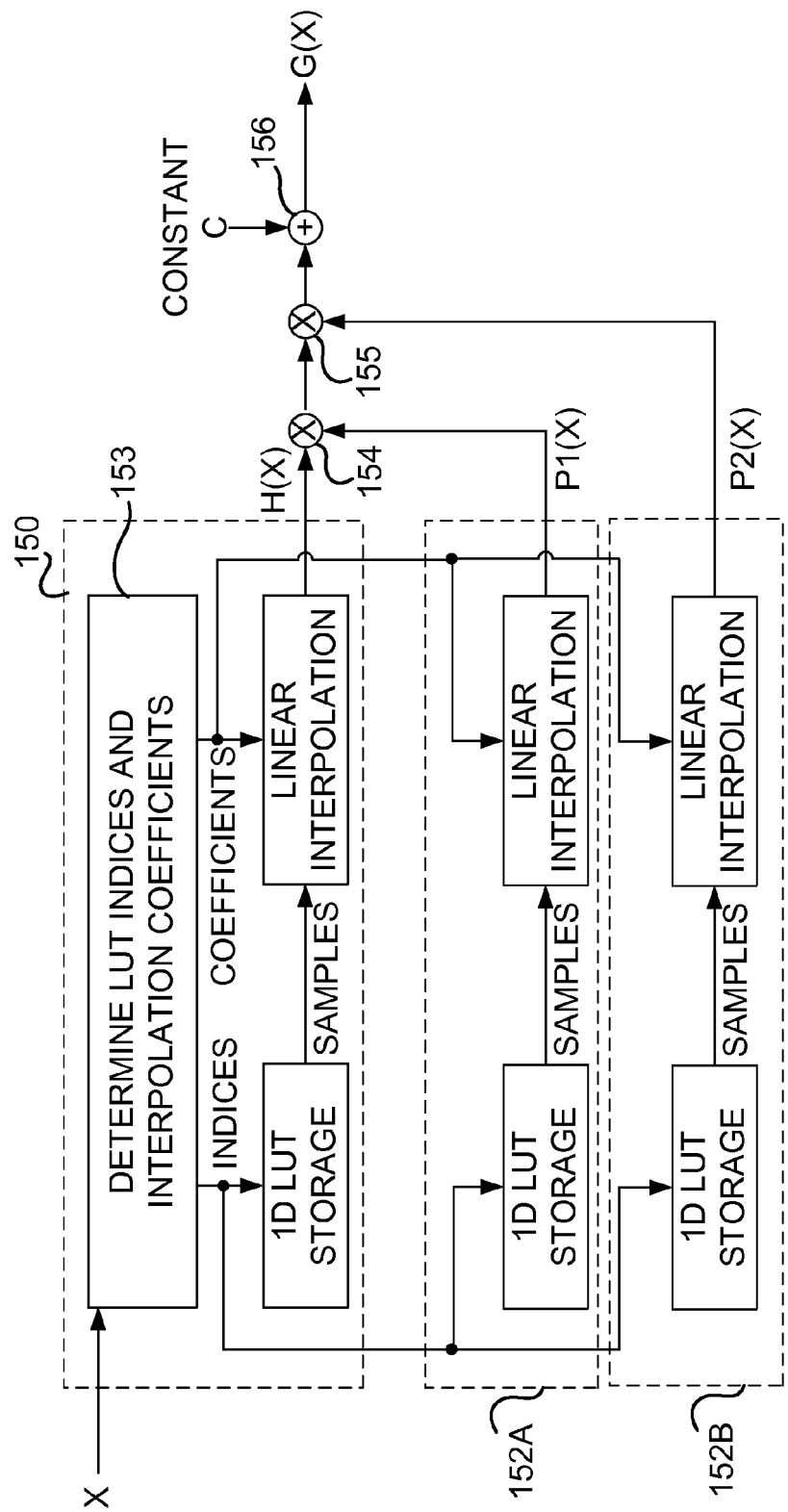
FIG. 30 is a block diagram depiction of a sixth embodiment of the second technique, utilizing a 1D LUT and two partial 1D LUTs.

FIG. 30 depicts a sixth embodiment of the second method in a 1D LUT context. A first 1D LUT module 150 implements linear interpolation to apply a first function H() to transform input signal X into a first output signal H(X) as previously described in relation to 1D LUT module 10A shown in FIG. 2A. A second, partial, 1D LUT module 152A is connected to receive the indices and coefficients generated by first 1D LUT module 150's control component 153 (i.e. second 1D LUT module 152A does not require a separate control component). A third, partial, 1D LUT module 152B is also connected to receive the indices and coefficients generated by first 1D LUT module 150's control component 153 (i.e. third 1D LUT module 152B also does not require a separate control component). Second 1D LUT module 152A implements linear interpolation to apply a second function P1() to transform the input signal X into a second output signal P1(X). Third 1D LUT module 152B implements linear interpolation to apply a third function P2() to transform the input signal X into a third output signal P2(X). First multiplier 154 multiplies first output signal H(X) with second output signal P1(X). Second multiplier 155 multiplies first multiplier 154's H(X) P1(X) output product with third output signal P2(X). Adder 156 adds an optional range-shifting constant C to second multiplier 155's H(X)·P1·(X)·P2(X) output product to produce the final output G(X)=H(X)·P1·(X)·P2·(X)+C. The FIG. 30 embodiment achieves improved accuracy through third order interpolation of the input signal which is common to all three 1D LUT modules 150, 152A and 152B, without redundant determination of indices and coefficients by either of LUT modules 152A or 152B.

Figure 31:
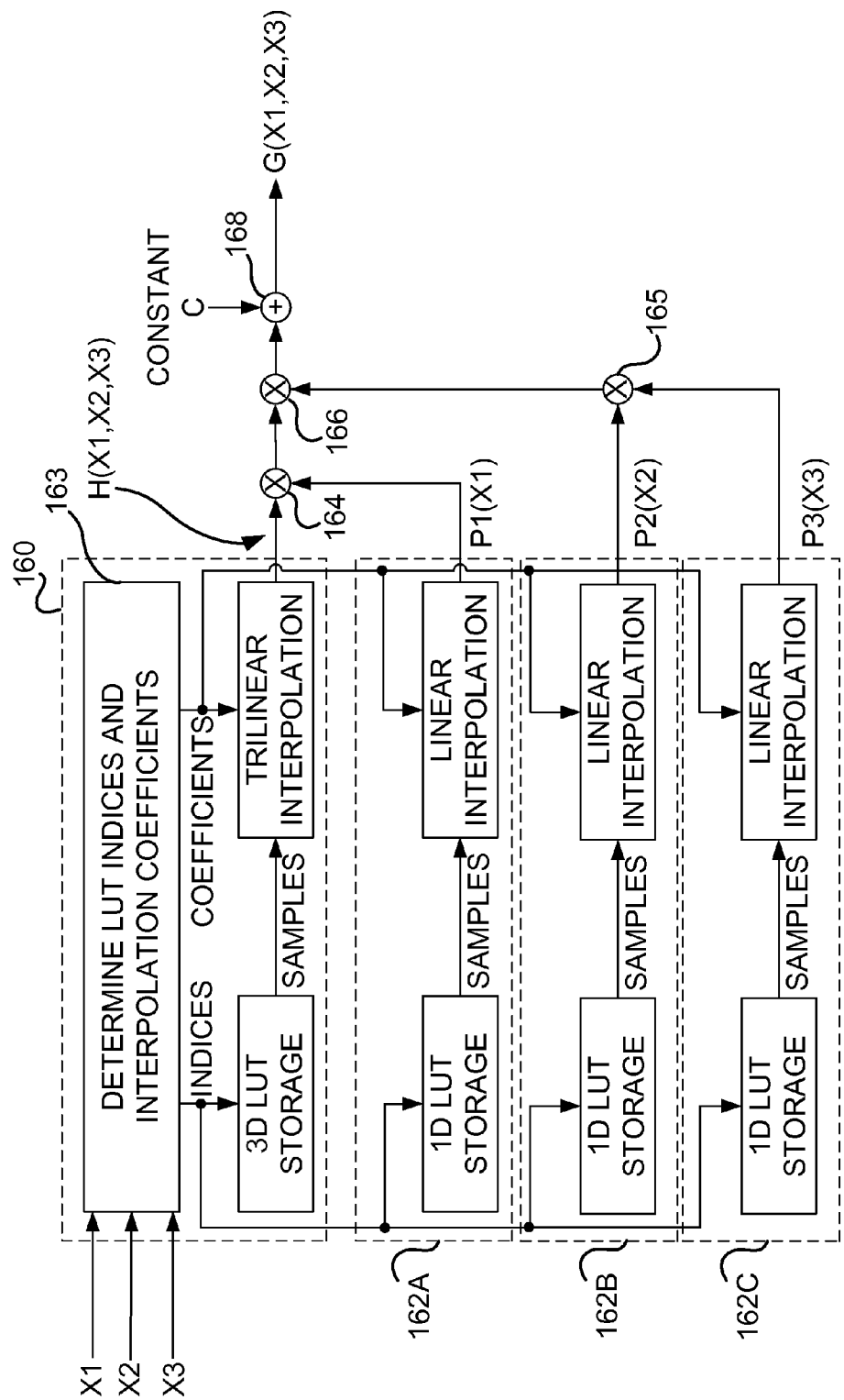
FIG. 31 is a block diagram depiction of a seventh embodiment of the second technique, utilizing a 3D LUT and three partial 1D LUTs.
Figure 32:
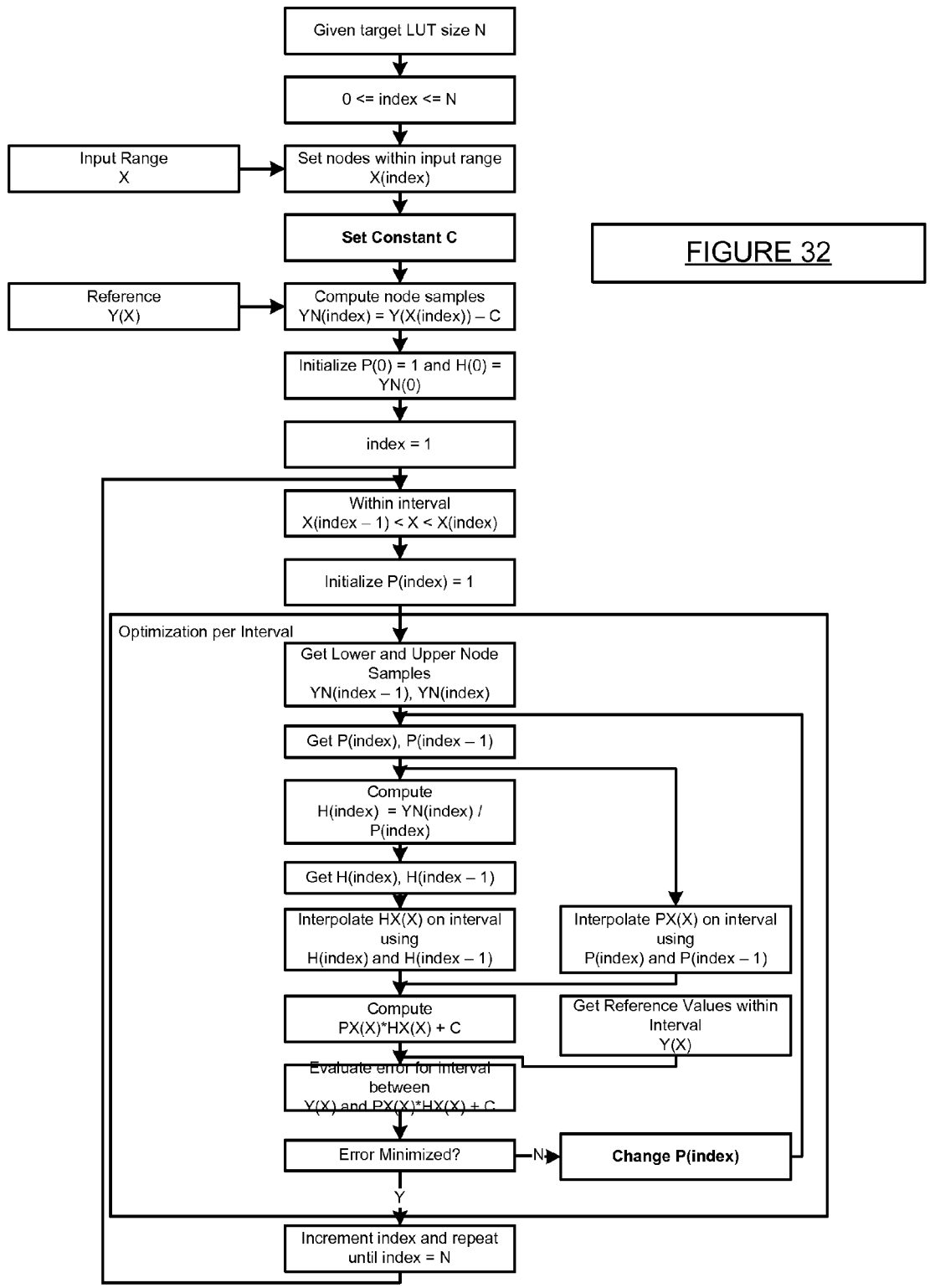
FIG. 32 is a flowchart depiction of a technique for generating a 1D LUT.

FIG. 31 depicts a seventh embodiment of the second method in a 3D LUT context. 3D LUT module 160 implements trilinear interpolation to apply a first function H() to transform three input signals X1,X2,X3 into a first output signal H(X1,X2,X3) as previously described in relation to 3D LUT module 10B shown in FIG. 2B. A first partial 1D LUT module 162A is connected to receive the indices and coefficients generated by 3D LUT module 160's control component 163 (i.e. LUT module 162A does not require a separate control component). Second and third partial 1D LUT modules 162B, 162C are each also connected to receive the indices and coefficients generated by 3D LUT module 160's control component 163 (i.e. neither of LUT modules 162B, 162C requires a separate control component). Partial 1D LUT modules 162A, 162B, 162C each implement linear interpolation to apply second, third and fourth functions P1(), P2(), P3() to transform the three input signals X1,X2,X3 into second, third and fourth output signals P1(X1), P2(X2), P3(X3) respectively. First multiplier 164 multiplies first output signal H(X1,X2,X3) with second output signal P1(X1). Second multiplier 165 multiplies third output signal P2(X2) with fourth output signal P3(X3). Third multiplier 166 multiplies first multiplier 164's H(X1,X2,X3)·P1(X1) output product with second multiplier 165's P2(X2)·P3(X3) output product. Adder 168 adds an optional range-shifting constant C to third multiplier 166's H(X1,X2,X3)·P1(X1)·P2(X2)·P3(X3) output product to produce the final output G(X)=H(X1,X2,X3)·P1(X1)·P2(X2)·P3(X3)+C. The FIG. 31 embodiment achieves improved accuracy through second order interpolation of each of the three input signals X1,X2,X3, without redundant determination of indices and coefficients by any of partial LUT modules 162A, 162B or 162C.

In general, the second method improves accuracy through higher order interpolation. For example, in the simplest 1D case (e.g. as shown in FIG. 28), the outputs of two 1D LUT modules each employing linear interpolation are multiplied together to form the final result which effectively achieves quadratic interpolation.

LUTs can be constructed to suit different situations, including (1) approximation of a predefined mathematical function, (2) approximation of a larger LUT via a smaller LUT, (3) approximation between data samples extracted from a known data set without reference values (i.e. smooth data interpolation without regard to interpolation accuracy).

Compatibility and Implementation

The above-described method 2 embodiments can be applied to produce the same results as conventional methods by reinitializing the component which implements the multiplying function P() to have values of 1 and by setting the value of range shifting constant C to 0. For the 1D case, if P(x)=1 and C=0 then G(x)=H(x)·P(x)+C=H(x) which can function as a conventional LUT module. Similarly, 3D method 2 embodiments can be reinitialized to function as a conventional 3D LUT. An LUT system capable of performing method 2 is accordingly compatible with a conventional LUT system if no change in the interpolation result is desired.

The lowest complexity LUT modules typically have fixed sizes of some power of 2 plus 1, uniformly spaced samples and built-in linear interpolation. Such modules are available in off-the-shelf form. Signal processing systems configured or configurable to apply 3D LUTs to transform color video signals are also commercially available. Programmable computing units for graphics processing units (GPU) to perform fast linear (1D), bilinear (2D) and trilinear (3D) interpolation operations using dedicated optimized hardware are also commercially available. Various method 2 embodiments can accordingly be constructed using off-the-shelf components integrated into signal processing systems.

CONCLUSION

It can be appreciated from the above that the invention may be embodied in methods, LUT systems for providing outputs that approximate functions (for example, inverse response characteristics), displays, image processing apparatus, and the like. These are only some examples of ways in which the invention may be applied.

Systems and modules described herein may comprise software, firmware, hardware, or any combination(s) of software, firmware, or hardware suitable for the purposes described herein. Software and other modules may reside on or in displays, devices having displays, servers, workstations, personal computers, computerized tablets, PDAs, and other devices suitable for the purposes described herein. In other words, the software and other modules described herein may be executed by a general purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

In some example embodiments, approximation errors that occur when color transformation values stored in color look-up tables are interpolated to produce color display drive signals are reduced by applying a pre-indexing function to the transformation values before they are stored in the look-up table, and by applying the same function to values extracted from the table during look-up operations. In some example embodiments, such errors can be reduced by providing one or more additional look-up tables to achieve higher order (i.e. more accurate) interpolation results that are achievable by interpolation of values stored in a single look-up table. Other example embodiments are described above.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer readable media, including magnetically or optically readable computer discs, hardwired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific examples of the system have been described herein for purposes of illustration, but that various modifications may be made without deviating from the spirit and scope of the system. Accordingly, the system is not limited except as by the appended claims.

What is claimed is:

1. A method of utilizing a lookup table generated to transform an input signal X into an output signal G(X), the method comprising:

applying the input signal X to the lookup table to produce a first output signal H(X);

applying a function P( ), where P( ) cannot equal 0 or 1 to the input signal X to produce a second output signal P(X); and multiplying the first and second output signals to produce a product $H(X) \cdot P(X)$;

further comprising adding a constant C to the product to produce the output signal $G(X)=H(X) P(X)+C$;

wherein the input signal X has three components X1, X2 and X3, the method further comprising:

in the lookup table, 3D interpolating the input signal components X1, X2 and X3 to produce the first output signal as $H(X)=H(X1,X2,X3)$;

wherein:

the applying a function $P(\cdot)$ step further comprises applying the function $P(\cdot)$ to a selected $i^{th}$ one of the input signal components X1, X2 or X3 to produce the second output signal as $P(X)=P(Xi)$ where i=1, 2 or 3;

the product $H(X) \cdot P(X)$ further comprises $H(X) \cdot P(X)=H(X1,X2,X3) \cdot P(Xi)$; and the output signal G(X) further comprises G(X)=G(X1,X2, X3)=H(X1,X2,X3)·P(Xi)+C.

2. The method according to claim 1, wherein the look up table is configured to perform non-uniform interpolation operations for a display device.

3. The method according to claim 1, wherein the input signal X comprises a sampled signal.

4. The method according to claim 3, wherein X1, X2, and X3 correspond to at least one of Red, Green, and Blue image data components.

5. The method according to claim 1, wherein the output signal G(X) G(X)=G(X1,X2,X3)=H(X1,X2,X3)·P(Xi)+C, where C=0.

6. The method according to claim 1, wherein the input signal comprises a video signal and the method is performed in one of a display, set-top box, and mobile phone.

7. A method of utilizing a lookup table generated to transform an input signal X into an output signal G(X), the method comprising:
applying the input signal X to the lookup table to produce a first output signal H(X);
applying a function P( ), where P( ) cannot equal 0 or 1 to the input signal X to produce a second output signal P(X); and
multiplying the first and second output signals to produce a product H(X)·P(X);
further comprising adding a constant C to the product to produce the output signal G(X)=H(X)·P(X)+C;
wherein the input signal X has three components X1, X2 and X3, the method further comprising:
in the lookup table, 3D interpolating the input signal components X1, X2 and X3 to produce the first output signal as H(X)=H(X1,X2,X3);
wherein:
the applying a function P() step further comprises 1D interpolating a selected $i^{th}$ one of the input signal components X1, X2 or X3 to produce the second output signal as P(X)=P(Xi) where i=1, 2 or 3;
the product H(X)·P(X) further comprises H(X)·P(X)=H(X1,X2,X3)·P(Xi); and
the output signal G(X) further comprises G(X)=G(X1,X2, X3)=H(X1,X2,X3)·P(Xi)+C.

8. The method according to claim 7, wherein the look up table is configured to perform non-uniform interpolation operations for a display device.

9. The method according to claim 7, wherein the input signal X comprises a sampled signal.

10. The method according to claim 7, wherein X1, X2, and X3 correspond to at least one of Red, Green, and Blue image data components.

11. The method according to claim 7, wherein the output signal G(X) G(X)=G(X1,X2,X3)=H(X1,X2,X3)·P(Xi)+C, where C=0.

12. The method according to claim 7, wherein the input signal comprises a video signal and the method is performed in at least one of a display, set-top box, and mobile device.

13. A method of utilizing a lookup table generated to transform an input signal X into an output signal G(X), the method comprising:
applying the input signal X to the lookup table to produce a first output signal H(X);
applying a function P( ), where P( ) cannot equal 0 or 1 to the input signal X to produce a second output signal P(X); and
multiplying the first and second output signals to produce a product H(X)·P(X);
further comprising:
in the lookup table, linearly interpolating the input signal to produce the first output signal;
wherein:
the applying a function P(·) step further comprises linearly interpolating the input signal to produce the second output signal.

14. The method according to claim 13, wherein the look up table is configured to perform non-uniform interpolation operations for a display device.

15. The method according to claim 13, wherein the input signal X comprises a sampled signal.

16. The method according to claim 13, wherein X1, X2, and X3 correspond to at least one of Red, Green, and Blue image data components.

17. The method according to claim 13, wherein the output signal G(X) G(X)=G(X1,X2,X3)=H(X1,X2,X3)·P(Xi)+C, where C=0.

18. The method according to claim 13, wherein the input signal comprises a video signal and the method is performed in at least one of a display, set-top box, mobile device, and a phone.

* * * * *